United States Patent
Dueweling et al.

(10) Patent No.: US 12,485,995 B2
(45) Date of Patent: Dec. 2, 2025

(54) ELECTROMECHANICAL DERAILLEUR

(71) Applicant: SRAM DEUTSCHLAND GmbH, Schweinfurt (DE)

(72) Inventors: Sebastian Dueweling, Schwienfurt (DE); Matthias Reinbold, Schweinfurt (DE); Robert Boehm, Schweinfurt (DE); Sven Baumann, Schweinfurt (DE); Sven Schmelzing, Schweinfurt (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 18/345,024

(22) Filed: Jun. 30, 2023

(65) Prior Publication Data

US 2023/0348019 A1 Nov. 2, 2023

Related U.S. Application Data

(63) Continuation of application No. 17/700,914, filed on Mar. 22, 2022, now Pat. No. 11,731,733, which is a continuation of application No. 16/412,667, filed on May 15, 2019, now Pat. No. 11,312,449.

(30) Foreign Application Priority Data

May 15, 2018 (DE) .................... 10 2018 207 493.3

(51) Int. Cl.
*B62M 9/122* (2010.01)
*B62M 9/123* (2010.01)

(52) U.S. Cl.
CPC ............ *B62M 9/122* (2013.01); *B62M 9/123* (2013.01)

(58) Field of Classification Search
CPC ...... B62M 25/08; B62M 9/122; B62M 9/123; B62M 9/132
USPC ............................................ 474/80
See application file for complete search history.

(56) References Cited

U.S. PATENT DOCUMENTS

| | | | | |
|---|---|---|---|---|
| 2,607,238 A | * | 8/1952 | English ................... | F16H 55/18 101/248 |
| 3,359,819 A | * | 12/1967 | Veillette .................. | F16H 55/18 74/411 |
| 3,809,486 A | * | 5/1974 | Foerstner ................. | H05B 6/64 219/722 |
| 5,213,548 A | * | 5/1993 | Colbert .................. | B62M 25/08 280/238 |
| 5,599,244 A | * | 2/1997 | Ethington .............. | B62M 9/123 474/81 |

(Continued)

FOREIGN PATENT DOCUMENTS

| | | |
|---|---|---|
| EP | 1010613 | 6/2000 |
| EP | 1310423 | 5/2003 |

(Continued)

*Primary Examiner* — Henry Y Liu

(57) ABSTRACT

An Actuating device for a bicycle is provided. The actuating device may include a static element which is positionally fixed in relation to a bicycle frame, a movable element which is movable in relation to the static element, an electromechanical drive which provides drive force for a movement of the movable element. The electromechanical drive has a motor and a gearing driven by the motor. The gearing may include a first gearing wheel and a second gearing wheel which is in engagement with the first gearing wheel.

11 Claims, 20 Drawing Sheets

| Shift stage S | Standard position s0 | Amount of trim x |
|---|---|---|
| 1 | s0_1 | x1 |
| 2 | s0_2 | x2 |
| 3 | s0_3 | x3 |
| 4 | s0_4 | x4 |
| 5 | s0_5 | x5 |
| 6 | s0_6 | x6 |
| 7 | s0_7 | x7 |
| 8 | s0_8 | x8 |
| 9 | s0_9 | x9 |
| 10 | s0_10 | x10 |
| 11 | s0_11 | x11 |

(56) References Cited

U.S. PATENT DOCUMENTS

| | | | | |
|---|---|---|---|---|
| 5,728,017 | A * | 3/1998 | Bellio | B62M 9/122 |
| | | | | 474/70 |
| 5,865,454 | A * | 2/1999 | Campagnolo | B62M 25/08 |
| | | | | 280/238 |
| 5,870,928 | A * | 2/1999 | Genter | F16H 57/12 |
| | | | | 74/440 |
| 6,148,684 | A * | 11/2000 | Gardiner | F16H 55/18 |
| | | | | 101/216 |
| 6,293,166 | B1 * | 9/2001 | Genter | F16H 57/12 |
| | | | | 74/397 |
| 6,682,087 | B1 * | 1/2004 | Takeda | B62K 23/00 |
| | | | | 701/52 |
| 6,931,958 | B2 * | 8/2005 | Takeda | B62M 25/08 |
| | | | | 701/52 |
| 6,945,888 | B2 * | 9/2005 | Fukuda | B62J 45/41 |
| | | | | 474/70 |
| 7,223,189 | B2 * | 5/2007 | Guderzo | B62J 50/22 |
| | | | | 474/70 |
| 7,288,038 | B2 * | 10/2007 | Takeda | B62M 9/132 |
| | | | | 474/80 |
| 7,306,531 | B2 * | 12/2007 | Ichida | B62M 9/122 |
| | | | | 474/70 |
| 7,373,232 | B2 * | 5/2008 | Guderzo | B62M 9/122 |
| | | | | 74/502.2 |
| 7,547,263 | B2 * | 6/2009 | Fukuda | B62M 25/08 |
| | | | | 701/55 |
| 9,008,923 | B2 * | 4/2015 | Takamoto | F16H 61/0202 |
| | | | | 474/155 |
| 9,121,494 | B2 * | 9/2015 | Buchleitner | F16H 55/18 |
| 9,278,728 | B1 * | 3/2016 | Sato | B62M 9/122 |
| 9,322,465 | B2 * | 4/2016 | Sandner | F16H 57/12 |
| 9,634,518 | B2 * | 4/2017 | Miglioranza | H02J 7/007194 |
| 9,714,067 | B1 * | 7/2017 | Hara | B62M 9/14 |
| 9,772,030 | B2 * | 9/2017 | Palfai | F16H 55/18 |
| 10,252,772 | B2 * | 4/2019 | Sala | B62M 9/132 |
| 2003/0160420 | A1 * | 8/2003 | Fukuda | B62M 25/08 |
| | | | | 280/260 |
| 2004/0089089 | A1 * | 5/2004 | Stevens | F16H 55/18 |
| | | | | 74/440 |
| 2004/0108680 | A1 * | 6/2004 | Guderzo | B62M 25/08 |
| | | | | 280/260 |
| 2005/0187048 | A1 * | 8/2005 | Fukuda | B62M 9/1244 |
| | | | | 474/70 |
| 2005/0187050 | A1 * | 8/2005 | Fukuda | B62M 25/08 |
| | | | | 474/82 |
| 2005/0215369 | A1 * | 9/2005 | Fukuda | B62M 25/08 |
| | | | | 474/70 |
| 2005/0227798 | A1 * | 10/2005 | Ichida | B62M 25/045 |
| | | | | 474/81 |
| 2005/0239587 | A1 * | 10/2005 | Ichida | B62M 9/132 |
| | | | | 474/82 |
| 2009/0204299 | A1 * | 8/2009 | Miglioranza | B62M 25/08 |
| | | | | 474/80 |
| 2009/0210118 | A1 * | 8/2009 | Takamoto | B62M 25/08 |
| | | | | 701/49 |
| 2013/0192405 | A1 * | 8/2013 | Katsura | B62M 9/105 |
| | | | | 74/473.12 |
| 2013/0213168 | A1 * | 8/2013 | Buchleitner | B22F 5/08 |
| | | | | 74/445 |
| 2014/0087901 | A1 * | 3/2014 | Shipman | B62M 9/131 |
| | | | | 429/100 |
| 2014/0102237 | A1 * | 4/2014 | Jordan | B62M 9/132 |
| | | | | 74/473.12 |
| 2014/0116174 | A1 * | 5/2014 | Sandner | F16H 57/12 |
| | | | | 74/440 |
| 2014/0216198 | A1 * | 8/2014 | Kariyama | B60T 7/102 |
| | | | | 74/502.6 |
| 2014/0224039 | A1 * | 8/2014 | Bjork | G01L 3/24 |
| | | | | 73/862.191 |
| 2014/0224053 | A1 * | 8/2014 | Buchleitner | F16H 55/17 |
| | | | | 74/445 |
| 2014/0287856 | A1 * | 9/2014 | Kuwayama | B62M 9/132 |
| | | | | 474/80 |
| 2014/0303857 | A1 * | 10/2014 | Takamoto | B62M 25/08 |
| | | | | 701/51 |
| 2014/0358387 | A1 * | 12/2014 | Cracco | B62M 9/132 |
| | | | | 701/51 |
| 2015/0006043 | A1 * | 1/2015 | Miglioranza | B62M 9/132 |
| | | | | 701/51 |
| 2015/0009019 | A1 * | 1/2015 | Watarai | B60R 16/04 |
| | | | | 340/12.5 |
| 2015/0020629 | A1 * | 1/2015 | Koszewnik | F16H 55/18 |
| | | | | 74/445 |
| 2015/0111675 | A1 * | 4/2015 | Shipman | B62M 9/122 |
| | | | | 474/82 |
| 2015/0137591 | A1 * | 5/2015 | Fusari | B62M 25/08 |
| | | | | 307/9.1 |
| 2015/0284049 | A1 * | 10/2015 | Shipman | B62M 25/08 |
| | | | | 74/473.12 |
| 2016/0031527 | A1 * | 2/2016 | Bortolozzo | B62M 9/133 |
| | | | | 701/58 |
| 2016/0033030 | A1 * | 2/2016 | Palfai | F16H 55/18 |
| | | | | 74/409 |
| 2016/0039497 | A1 * | 2/2016 | Mastracci | B62J 45/423 |
| | | | | 701/55 |
| 2016/0046352 | A1 * | 2/2016 | Shipman | B62M 9/128 |
| | | | | 29/428 |
| 2016/0257269 | A1 * | 9/2016 | Watarai | B62J 43/13 |
| 2016/0288877 | A1 * | 10/2016 | Goates | B62M 9/122 |
| 2016/0339986 | A1 * | 11/2016 | Jordan | G08C 17/02 |
| 2017/0021897 | A1 * | 1/2017 | Bortolozzo | B62J 50/22 |
| 2017/0106866 | A1 * | 4/2017 | Schieffelin | B60W 10/11 |
| 2017/0197685 | A1 * | 7/2017 | Braedt | B62M 9/122 |
| 2017/0247082 | A1 * | 8/2017 | Katsura | B62M 9/132 |
| 2018/0208269 | A1 * | 7/2018 | Nose | B62K 25/08 |
| 2018/0346058 | A1 * | 12/2018 | Brown | B62M 9/126 |
| 2018/0370598 | A1 * | 12/2018 | Chang | B62M 9/128 |
| 2019/0344857 | A1 * | 11/2019 | Fossato | B62M 6/50 |

FOREIGN PATENT DOCUMENTS

| | | |
|---|---|---|
| EP | 2093141 | 8/2009 |
| EP | 2868566 | 5/2015 |

* cited by examiner

| Shift stage S | Standard position s0 | Amount of trim x |
| --- | --- | --- |
| 1 | s0_1 | x1 |
| 2 | s0_2 | x2 |
| 3 | s0_3 | x3 |
| 4 | s0_4 | x4 |
| 5 | s0_5 | x5 |
| 6 | s0_6 | x6 |
| 7 | s0_7 | x7 |
| 8 | s0_8 | x8 |
| 9 | s0_9 | x9 |
| 10 | s0_10 | x10 |
| 11 | s0_11 | x11 |

Fig. 22

ELECTROMECHANICAL DERAILLEUR

This application is a continuation of U.S. patent application Ser. No. 17/700,914, filed Mar. 22, 2022, which is a continuation of U.S. patent application Ser. No. 16/412,667, filed May 15, 2019, which claims priority to, and/or the benefit of, German patent application DE 10 2018 207 493.3 filed May 15, 2018, the contents all of which are incorporated herein in their entirety.

FIELD OF INVENTION

The invention relates to actuating devices for bicycles, to methods for controlling actuating devices for bicycles, and to methods for setting such actuating devices.

BACKGROUND

An electromechanical actuating device for a bicycle in the form of an electrical shift mechanism is known for example from US 2015/0111675 A1 and comprises an element to be fastened to the bicycle frame, an element movable relative to the former element, and an electromechanical drive, which moves the movable element in relation to the static element in order to set a desired shift stage. The electromechanical drive is operated by means of a motor-gearing arrangement which reduces the rotational speed of an electric motor and provides this to a gearing output shaft for moving the movable element. For reliable setting of the setpoint position of the movable element, a position detection device is provided which, in the form of an electromagnetic rotation sensor, determines the rotational position of a position detection wheel that meshes with the gearing output shaft. In order to reduce inaccuracies in the detection of the rotational position owing to play between the position detection wheel and the gearing output shaft, the position detection wheel is additionally in engagement with a bracing wheel, which is continuously preloaded in a direction of rotation by a torsion spring. Irrespective of a direction of rotation of the gearing output shaft, the position detection wheel is thus always in abutting contact with the same tooth flanks. A disadvantage of this construction is that the force of the torsion spring is dependent on the rotational position of the bracing wheel, and the bracing force which is configured for optimum operation acts only at a particular rotational angle or over a small rotational angle range. By contrast, at the start and at the end of the rotational angle range, the bracing force of the torsion spring is either too low, such that the play reduction is no longer reliably ensured, or is too high, such that the torsion spring has too great an influence on the output torque of the gearing.

A further challenge in the design of electromechanical actuating devices for bicycles lies in the design and positioning of the gearing elements, in particular of the stepped toothed wheels installed therein. In the case of the known solutions, at least a relatively small one of the two toothed wheels of the stepped toothed wheel, also referred to as "pinion", is formed in one piece with the gearing shaft. In order to satisfy increasing demands on the torques to be transmitted, there is now a demand to use hardened toothed-wheel stages. Here, there is however the problem that hardening of the pinion together with its gearing axle leads to hardening distortion in particular in the case of relatively long axles, and the positioning accuracy of the gearing shafts is impaired. Furthermore, previous stepped toothed wheels place relatively high demands on the position of the bearing arrangement of the mounting of the gearing axles in the associated rotary bearings.

The assembly of conventional gearings for electromechanical actuating devices for bicycles is furthermore made more difficult by the fact that the position of the output shaft of the motor must be coordinated very accurately with the position of the input element of the gearing. This may be a problem in particular if, in accordance with the constant demand for a reduction in weight of bicycle components, a plastics material is used as material for the housing, because screw connections for the fastening of motor or gearing components to the housing harbour the risk that the exact position of the elements is dependent on the tightening force of the screws. Such screw connections between metal and plastic furthermore have a tendency to distort or loosen over time.

A further electromechanical actuating device is known from DE 42 12 320 A1. This actuating device, too, comprises a static element to be fastened to the bicycle frame, an element which is movable in relation to the static element, and an electromechanical drive, which provides drive force for a movement of the movable element. Here, the actuating device is part of an electromechanical shift mechanism for setting different shift stages of a derailleur system. To prevent damage to the electromechanical drive in the event of a blockage of the movable element, the known actuating device is configured to identify such a blockage and shut off the motor current. To prevent overloading of gearing and motor, it is furthermore possible for an overload clutch to be used which shuts off the force flow from the motor to the movable element if a predetermined overload torque is exceeded at the overload clutch.

In practice, it has been found that, for a satisfactory operation of an electromechanical actuating device of said type, extremely accurate coordination between the maximum motor current, the overload torque and the time of the shutting-off of the motor current must be implemented in order to achieve the desired effect of preventing damage. If the overload torque is set to be too high, then very intense loading of motor and gearing occurs in the event of a blockage of the movable element. If the overload torque is set to be too low, then overly frequent erroneous activation of the overload clutch occurs, along with both functional impairment of the actuating device and excessive generation of noise. Furthermore, the measurement of the motor current in order to detect a blockage state is relatively complex.

The electromechanical actuating device known from DE 42 12 320 A1 furthermore has a trim function for the setting and readjustment of the alignment between shift mechanism and pinion assembly. In particular in the case of shift mechanisms with a large number of shift stages, exact positioning between shift mechanism and pinion assembly is of crucial importance for setting of the respective shift stages without rubbing. For this purpose, the trim function of the known control device permits the displacement of the shift positions by a particular amount of trim in order to compensate for manufacturing tolerances of the shift assembly or deviations between different frame models and different pinion assemblies. The known actuating device thus realizes the same trim function as is also already known from purely mechanically operating shift mechanisms by means of the setting of a length of the shift cable.

Although it is possible with the known trim function to achieve a coordination between the position of the shift mechanism and the position of the pinion assembly, it has nevertheless been found that, in particular with an increase in the number of shift stages, there is still a demand for improvement of the shift accuracy, and, in certain configurations, "rubbing" of a shift stage is difficult to prevent. A fault-free shift can therefore be attained only with a combination of a particular shift mechanism type and an associated pinion assembly. However, in the event of deviations from the ideal situation, for example owing to the use of other components or else owing to a bent derailleur hanger, owing to tolerance deviations of the frame, owing to tolerance deviations of the pinion assembly or owing to tolerance deviations of the shift mechanism, precise shifting of all shift stages can no longer be attained to the desired degree by means of the known trim functions.

A further difficulty in the setting of the shift positions by means of the conventional trim function arises with an increase in the number of shift stages correspondingly to an increase in the number of pinions in the pinion assembly, for example an increase of the number of pinions from conventionally approximately five to seven to ten or more, for example twelve pinions. A corresponding axial enlargement of the pinion assembly and thus of the distance between lowest shift position and highest shift position leads to particularly intense skew of the chain between the front sprocket and the pinion assembly in the lowest and highest shift positions. The skew of the chain exerts a force in an axial direction on the chain guide wheels of the shift mechanism and thus exerts load on the shift mechanism in one direction, which opposes precise setting of the shift positions. Owing to these forces, the shift mechanism therefore does not reach the desired setpoint positions in the highest and lowest shift stages, consequently resulting in rough chain running, rough shifting, running noises in these shift stages, and possibly even inadvertent shifting.

It is generally an object of the present invention according to the aspects discussed below to specify actuating devices and associated methods which address one or more of the above-stated disadvantages of the prior art and highlight corresponding ways of improving such devices and methods.

SUMMARY

In an embodiment, an actuating device for a bicycle is provided. The actuation device, such as a gear changer or derailleur, for the bicycle includes a static element which is arranged positionally fixed in relation to a bicycle frame. The actuation device also includes
 a movable element which is movable in relation to the static element, and an electromechanical drive which provides drive force for a movement of the movable element, wherein the electromechanical drive has a motor and a gearing driven by the motor. The gearing may include a first gearing wheel and a second gearing wheel which is in engagement with the first gearing wheel. The second gearing wheel may include two partial wheels each with the same number of teeth, which partial wheels are both simultaneously in engagement with the first gearing wheel. The partial wheels may be rotatable about the same axis of rotation and are preloaded relative to one another by a force in a direction of rotation about the axis of rotation.

In an embodiment, an actuating device for a bicycle is provided. The actuation device, such as a gear changer or derailleur includes a static element which is arranged fixedly in relation to a bicycle frame, a movable element which is movable in relation to the static element, and an operating device which permits the selection of a desired shift stage from a multiplicity of available shift stages and which is configured for moving the movable element into a shift position corresponding to the selected shift stage. The actuating device may also include a trim device which permits an adjustment of the shift positions assigned to the shift stage. The trim device may be configured to, for at least two shift stages, adjust the assigned shift positions by different amounts of trim.

In an embodiment, an actuating device for a bicycle is provided. The actuating device, such as a gear changer or derailleur includes a static element which is configured to be arranged positionally fixed relative to a bicycle frame, a movable element which is movable in relation to the static element, an electromechanical drive which provides drive force for a movement of the movable element. The actuating device also may include an electronic control device in which, for a multiplicity of shift stages, in each case for each shift stage, there is stored at least one shift position parameter which corresponds to a shift position of the movable element in the respective shift stage, wherein the control device is configured to, in reaction to a shift stage selection signal which represents a shift stage to be set, activate the electromechanical drive on the basis of the shift position parameter of the shift stage to be set such that the movable element reaches the shift position. The actuating device may also include a trim device configured such that at least one of the shift position parameters can be changed independently of all of the other shift position parameters at the instigation of a user.

BRIEF DESCRIPTION OF THE DRAWINGS

The invention will be discussed in more detail below on the basis of embodiments and with reference to the appended drawings, in which:

FIG. 22 shows a shift table for the actuating device of the embodiment.

DETAILED DESCRIPTION OF THE DRAWINGS

Figure 1:
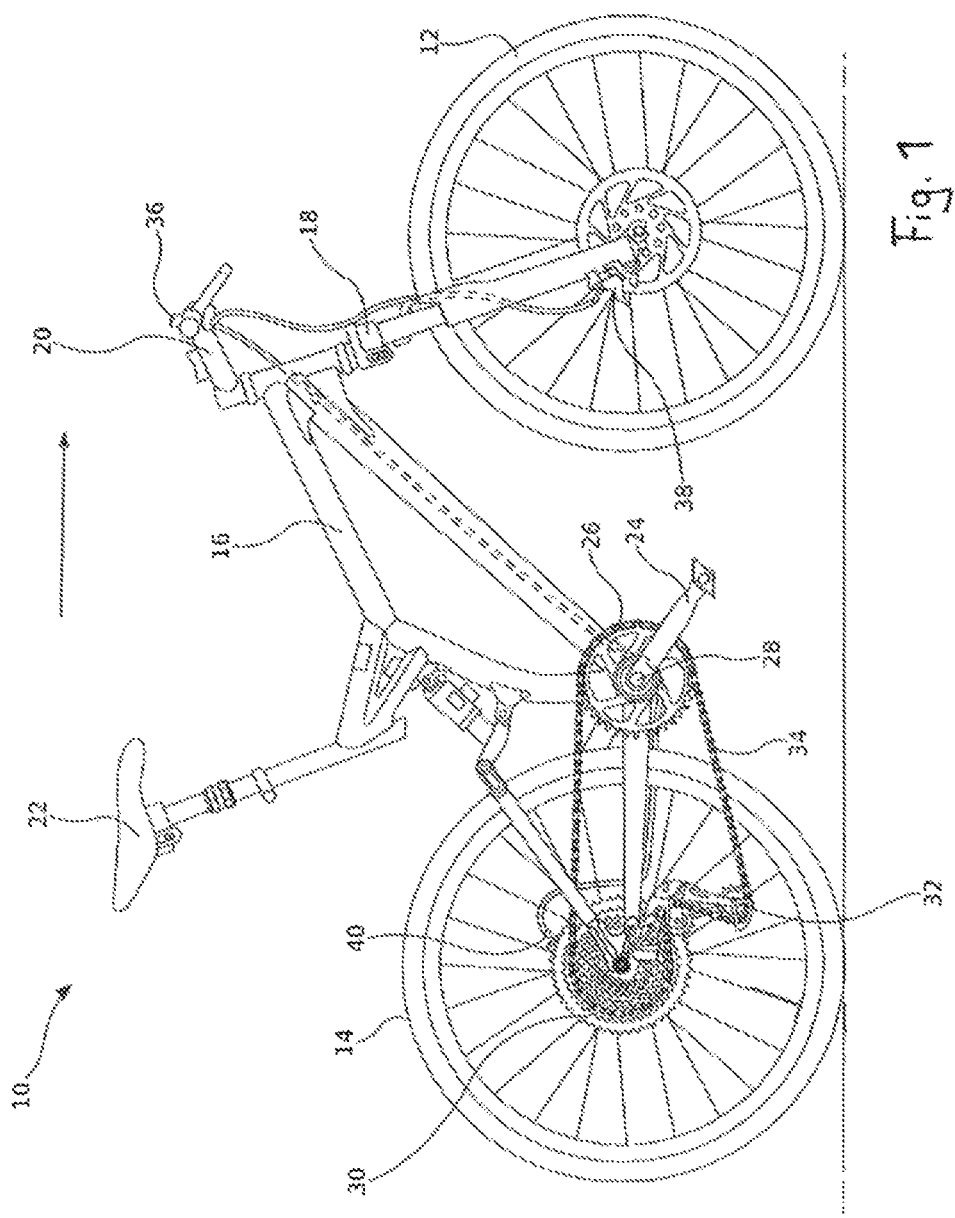
FIG. 1 shows an overall view of a bicycle according to a first embodiment.

It is a first object of the invention to provide an actuating device for a bicycle, which comprises an electromechanical drive with a motor and with a gearing, wherein particularly precise and reliable operation is made possible by means of increased position accuracy between the elements of the drive.

According to a first embodiment, the above-stated first object is achieved by means of an actuating device for a bicycle, comprising a static element which is arranged positionally fixed in relation to a bicycle frame, a movable element which is movable in relation to the static element, an electromechanical drive which provides drive force for a movement of the movable element, wherein the electromechanical drive has a motor and a gearing driven by the motor, wherein the gearing comprises a first gearing wheel and a second gearing wheel which is in engagement with the first gearing wheel, wherein the second gearing wheel comprises two partial wheels each with the same number of teeth, which partial wheels are both simultaneously in engagement with the first gearing wheel, wherein the partial wheels are rotatable about the same axis of rotation and are preloaded relative to one another by a force in a direction of rotation about the axis of rotation. It is to be noted here that, in the context of the present disclosure, "gearing wheels" are preferably to be understood to mean toothed wheels. Individual gearing wheels could however perform the functions described herein even without tooth engagement, for example by means of frictional engagement, such that non-toothed wheels of said type are also regarded as gearing wheels.

According to an embodiment, the second gearing wheel thus has two partial wheels with the same number of teeth, which partial wheels are preloaded relative to one another and are simultaneously in engagement with the first gearing wheel. Those teeth of the two partial wheels which are presently in engagement with the first gearing wheel are pressed by the force in the direction of opposite tooth flanks of the first gearing wheel, and bear against said tooth flanks without play. Irrespective of the direction of rotation of the first gearing wheel, therefore, the teeth of the two partial wheels are always in play-free engagement with the respective tooth flanks of the first gearing wheel. As a result, an accuracy of the rotational position of the second gearing wheel can be increased independently of the rotational position of the first gearing wheel.

The force between the two partial wheels may be generated by means of a force-generating device which is arranged functionally between the two partial wheels so as to be supported at one side on a first partial wheel of the two partial wheels and supported at the other side on a second partial wheel of the two partial wheels. The force-generating device may in particular be an elastic device, for example a torsion spring. By contrast to the prior art, an elastic device of said type is then however not supported on a fixed component, but rather generates a relative force between the two partial wheels in order to preload the partial wheels in opposite directions of rotation.

Since the partial wheels are preloaded relative to one another, but their relative positions with respect to one another substantially do not change during a rotation of the second gearing wheel or of the first gearing wheel, the force which preloads the partial wheels relative to one another is independent of a rotational position of the second gearing wheel. As a result, a reliable reduction in play can be achieved in every rotational position of the second gearing wheel, and the force can be configured so as to substantially not influence the torque at the first gearing wheel.

In one embodiment, a first partial wheel of the two partial wheels may be mounted with a predetermined first radial play relative to the axis of rotation and a second partial wheel of the two partial wheels may be mounted with a predetermined second radial play, which is smaller than the first radial play, or without radial play, relative to the axis of rotation. The first partial wheel, which is mounted with (a relatively large degree of) play, is then capable of adopting a slightly eccentric position in relation to the axis of rotation in order to move into a deviating position relative to the second partial wheel not only in a direction of rotation but also in a radial direction, and further eliminate a degree of flank play relative to the first gearing wheel. Here, it is envisaged in particular that the radial (relatively large degree of) play of the first partial wheel is also controlled by means of a force, for example by means of a force of the same force-generating device that also preloads the relative rotation of the two partial wheels with respect to one another.

The (relatively large degree of) radial play of the first partial wheel may be realized in particular by virtue of the two partial wheels being mounted on a common gearing shaft, wherein a diameter of an axial portion of the gearing shaft on which the first partial wheel is mounted is smaller than a diameter of an axial portion of the gearing shaft on which the second partial wheel is mounted. In this embodiment, it is possible in particular for both partial wheels to be structurally identical, such that cost and assembly outlay is reduced. Alternatively or in addition, it would however be possible for the diameter of a central opening, which receives the gearing shaft, of the first partial wheel to be larger than a diameter of a central opening, which receives the gearing shaft, of the second partial wheel.

In a further embodiment, the actuating device comprises a position detection device for detecting a present rotational position of the first gearing wheel of the gearing, wherein the second gearing wheel is part of said position detection device. In particular, the second gearing wheel may bear a sensor element of a rotational position sensor, or the position detection device may comprise a third gearing wheel which is in engagement with the second gearing wheel, in particular with both partial wheels of the second gearing wheel, and which bears a sensor element of a rotational position sensor. Through the use of the second gearing wheel which comprises a first and a second partial wheel, such that a degree of play between the first gearing wheel and the second gearing wheel is reduced in the manner described above, an accuracy of the position detection can be significantly improved. In particular, the position in accuracy resulting from the play can be eliminated.

According to a second embodiment, the above-stated first object is achieved by means of an electromechanical actuating device for a bicycle, comprising a static element which is arranged positionally fixed in relation to a bicycle frame, a movable element which is movable in relation to the static element, an electromechanical drive which provides drive force for a movement of the movable element, wherein the electromechanical drive has a motor and a gearing driven by the motor and wherein the gearing has at least one stepped tooth wheel with at least two coaxial toothed wheels with different numbers of teeth, wherein the two toothed wheels of the stepped tooth wheel each have a central opening into which a gearing shaft is inserted.

According to the second embodiment, it is thus the case that both toothed gears of the stepped toothed gear are formed separately from the gearing shaft. Here, the two toothed gears may in turn likewise be formed as separate components, which are in particular fastened to one another, or formed integrally with one another. The separate formation of the toothed wheels and of the gearing shaft makes it possible for the respective elements of the stepped toothed wheel to be designed and configured in a manner respectively adapted to their intended use. Accordingly, it is possible for the material of the gearing shaft to have a relatively low hardness in order to prevent hardening distortion, in particular in the case of relatively long gearing shafts, whereas the material of the toothed wheels may have a relatively high hardness in order to be able to reliably transmit even relatively high torques with little wear. It is furthermore envisaged that at least one of the two toothed wheels is held rotatably on the gearing shaft, preferably that both toothed wheels are rotatable. The rotational forces of the gearing are thus not introduced into the gearing shaft, such that inexpensive rotationally fixed installation of the gearing shaft is possible.

According to a third embodiment, the above-stated first object is achieved by means of an actuating device for a bicycle, comprising a static element which is arranged positionally fixed in relation to a bicycle frame, a movable element which is movable in relation to the static element, an electromechanical drive which provides drive force for a movement of the movable element, wherein the electromechanical drive comprises a housing and a motor fastened in the housing, wherein the actuating device furthermore has a motor carrier, wherein the motor carrier has first fastening means for the fastening of the motor carrier to the housing and has second fastening means which are separate from the first fastening means and which serve for the fastening of the motor to the motor carrier.

Through the provision of a separate motor carrier and separate fastening means firstly for the fastening of the motor carrier to the housing and secondly for the fastening of the motor to the motor carrier, it is possible to improve the position accuracy of the motor in relation to the housing and at the same time facilitate the installation of the motor. Accordingly, the first fastening means may be adapted specifically to the material of the housing in order, for example even in the case of a housing formed from relatively soft material, to ensure precise and stable positioning, whereas the second fastening means may be configured for simple and reliable installation of the motor.

In a preferred embodiment, the first fastening means may be realized by virtue of the motor carrier being at least partially embedded into, in particular formed into, the material of the housing. For this purpose, the motor carrier may for example have special projections and/or apertures which ensure particularly secure positive locking hold in the material of the housing. Alternatively or in addition, a screw connection or an adhesive connection may be used as first fastening means.

The housing is preferably formed from a plastics material for the purposes of reducing weight. The motor carrier may then be formed for example from metal in order to permit simple and accurate installation of the motor on the motor carrier, for example by means of a screw connection.

It is a second object of the present invention to provide an actuating device for a bicycle and a method for controlling or adjusting an actuating device for a bicycle, which, in the event of a malfunction, in particular owing to external mechanical influences, ensure an appropriate reaction of the actuating device and prevent damage or overloading of the actuating device.

According to a fourth embodiment, the above-stated second object is achieved by means of a method for controlling an actuating device for a bicycle, wherein the actuating device comprises: a static element which is arranged positionally fixed in relation to a bicycle frame, a movable element which is movable in relation to the static element, an electromechanical drive which provides drive force for a movement of the movable element, and a fault detection device which detects a fault relating to the movement of the movable element, wherein the method has the following steps: generating a first drive control signal, in order to drive the electromechanical drive with a first level of drive power, if the fault detection device detects no fault, and generating a second drive control signal, in order to drive the electromechanical drive with a second level of drive power, if the fault detection device detects a fault, wherein the second level of drive power is lower than the first level of drive power but is greater than zero.

According to the fourth aspect, it is thus the case that the motor continues to be operated with a reduced drive power, in the event of a fault being detected. It is thus firstly possible to avoid overloading of the motor or of the gearing, by virtue of the drive power being reduced. Secondly, the second drive power is however greater than zero, such that the actuating device continues the attempt to perform the desired actuating process. Thus, if only a temporary impairment of the freedom of movement of the movable element occurs, the desired movement can nevertheless be performed without the rider having to give another operator control command.

It is to be noted here that actuating devices are generally designed such that the drive power prevailing at the electromechanical drive is considerably higher than the power presently required for a movement of the movable element. In this way, it is ensured that a fast and reliable actuating process is ensured even if the friction forces within the actuating device are increased as a result of wear or fouling. The embodiment utilizes this clearance in order, even after detection of a fault, to maintain a reduced second drive power for a period of time and continue to attempt to nevertheless still perform the desired actuating movement. During this time, the actuating device is however not subjected to excessive loading. Only if the fault endures for a relatively long period of time can a complete shutting-off of the drive power and notification of a fault occur.

The detection of a fault may be performed on the basis of a signal from a position detection device. For example a gearing of the electric mechanical drive may have a rotational position sensor which detects a rotational position of one of the gearing wheels of the gearing. According to the method of the fourth embodiment, a fault may be detected if the position detection device identifies that, despite the presence of drive power, no movement of the electric magnetic drive or of the movable element occurs.

The second drive control signal is preferably generated, in order to reduce the drive power to the second drive power, after the expiry of a first time period after the identification of a fault. In a further variant, the electromechanical drive is stopped if the fault endures for a predetermined second time after the second drive signal has been generated.

In a further embodiment, the actuating device may furthermore have an overload clutch which is arranged functionally between a drive source of the electric mechanical drive and an output member of the electromechanical drive and which shuts off a transmission of drive force from the drive source to the output member if a force acting on the overload clutch exceeds a predetermined overload threshold value. Such an overload clutch can interrupt the force path between the movable element and the drive source in the event of an exceptional loading, for example resulting from an impact or jamming of the actuating device, in order to prevent damage to the drive source or other elements of the electromechanical drive. For example, use may be made of a slipping clutch with a defined and possibly settable overload threshold value.

In one refinement of this embodiment, provision is made whereby the first level of drive power is configured such that, in the event of a blockage of the movement of the output member, the force acting on the overload clutch is greater than the overload threshold value, such that the drive with the first level of drive power would activate the overload clutch, whereas the second level of drive power is configured such that, in the event of a blockage of the movement of the output member, the force acting on the overload clutch is lower than the overload threshold value, such that the second drive power is not sufficient to activate the overload clutch. By means of this measure, it can be ensured that, in the event of a fault, no repeated activation of the overload clutch and associated generation of noise, and particularly high loading of the overload clutch, occur, and nevertheless the efforts to move the actuating device are continued.

It is a third object of the invention to provide an actuating device for a bicycle, in particular for a shift arrangement for a bicycle, which permits more exact setting and coordination of the actuating device with respect to the specific installation situation and/or permits a compensation of wear phenomena and in this way ensures more precise operation.

According to a fifth embodiment, the third object is achieved by means of an actuating device for a bicycle, comprising a static element which is arranged positionally fixed in relation to a bicycle frame, a movable element which is movable in relation to the static element, an operating device which permits the selection of a desired shift stage from a multiplicity of available shift stages and which is configured for moving the movable element into a shift position corresponding to the selected shift stage, and a trim device which permits an adjustment of the shift positions assigned to the shift stage, wherein the trim device is configured to, for at least two shift stages, adjust the assigned shift positions by different amounts of trim.

According to one important feature of the embodiment, the trim device is accordingly capable of adjusting (trimming) different shift positions with different amounts of trim, whereby the possibilities for the adaptation and readjustment of the actuating device are multiplied. Accordingly, during installation of a shift mechanism on a bicycle, not only is positioning the actuating device in relation to the pinion assembly as a whole possible, but also, the relative positions of the individual shift positions with respect to one another can be varied, in order to react to manufacturing tolerances or wear. Furthermore, it is also possible for shift inaccuracies in extreme shift stages owing to intense skew of the chain and associated axial forces on the shift mechanism to be compensated.

The trim device may in particular have a setting means in order, for at least two shift stages, preferably for all shift stages, to adjust the amounts of trim relative to one another. In a trim device of particularly simple construction, the amounts of trim of multiple shift stages, preferably of all shift stages, may be adjusted relative to one another simultaneously by means of a single setting process. For example, the trim device may be configured to, for all shift stages of a series of successive shift stages, adjust the respective shift positions by in each case increasing amounts of trim, and/or, for all shift stages for a series of successive shift stages, adjust the respective shift positions by in each case decreasing amounts of trim. In this way, it is possible in particular for common misalignments between the shift positions and the respective pinions to be corrected, which occur to a greater degree in the extreme shift stages (lowest or highest shift stages). This includes in particular also the correction of shift inaccuracies owing to intense skew of the chain, such as arises in particular in the case of pinion assemblies with a large number of pinions (ten or more pinions, in particular twelve pinions) and/or in the case of short chain lengths. For the correction of intense chain skew, it may for example be advantageous if a neutral (for example central) shift stage corresponding to a neutral (for example central) shift position in which no or only little chain skew occurs is assigned a predetermined first amount of trim, and if shift stages whose shift positions are at a progressively greater distance from the shift position of the neutral shift stage are assigned progressively greater amounts of trim. In other words, the amounts of trim of the shift stages increase in each case towards the edges, that is to say towards high shift positions and towards low shift positions. Preferably, for such a configuration, it is also possible to set the magnitude of this increase in each case.

It is basically proposed that the trim function according to the fifth embodiment be used both for actuating devices with an electromechanical drive and for actuating devices with purely mechanical function. If an electromechanical drive is used, then amounts of trim for the individual shift stages may each be stored in a memory, in particular in the form of different trim programs as respective datasets with trim values for each shift stage, or may be input as input values into the actuating device by a user or by another appliance. In the case of a mechanical actuating device, mechanical setting means, such as for example setting screws, may be used in order to perform the desired adjustment of the shift positions. Here, it is envisaged in particular that the operating device may have a shift control cable and a winding body for selectively winding up or releasing the shift control cable, wherein the winding body has a trim element by means of which a winding contour of the winding body is adjustable. By influencing the winding contour, it is then possible to achieve that an adjustment of the cable strand during a trim process has an effect to different extents on different shift positions.

According to a sixth aspect, the above-stated third object of the invention is achieved by means of an actuating device for a bicycle, which comprises: a static element which is arranged positionally fixed in relation to a bicycle frame, a movable element which is movable in relation to the static element, an electromechanical drive which provides drive force for a movement of the movable element, an electronic control device in which, for a multiplicity of shift stages, in each case for each shift stage, there is stored at least one shift position parameter which corresponds to a shift position of the movable element in the respective shift stage, wherein the control device is configured to, in reaction to a shift stage selection signal which represents a shift stage to be set, activate the electromechanical drive on the basis of the shift position parameter of the shift stage to be set such that the movable element reaches the shift position, wherein the actuating device furthermore has a trim device by means of which at least one of the shift position parameters can be changed independently of all of the other shift position parameters at the instigation of a user.

This actuating device also permits more exact trimming or setting of the actuating device in order to be able to react to a specific installation situation on the bicycle or to wear phenomena, such that precise shifting can be ensured. For this purpose, provision is made whereby, in an electronic control device, shift position parameters are stored for each shift stage, which shift position parameters each represent shift positions of the movable element in the respective shift stage. According to an embodiment, the shift position parameters can be set independently of one another, such that maximum freedom for the adaptation or the trimming of the actuating device is realized.

Preferably, in the control device, for each shift stage of the multiplicity of shift stages, there is stored in each case one standard position parameter which corresponds to a predetermined standard shift position of the movable element. Therefore, in the event of an adaptation of the actuating device, corrections only need to be performed if this is necessary for a particular shift position. Furthermore, the actuating device can be quickly reset into a standard state. The shift position parameter may for example represent a deviation from the standard position parameter, and may then also be referred to as trim parameter, which permits intuitive operator control.

In an embodiment, the actuating device comprises an acceleration sensor which provides an item of information relating to a vibration of the actuating device. A vibration of the actuating device may include information regarding whether the movable element is situated in an optimum shift position for the respective shift stage, or how great the distance is between the present shift position and an optimum shift position. In general, a misalignment between the movable element and the pinion, that is to say a deviation of the shift position from an optimum shift position, may be characterized by intensified vibration or noise generation of the actuating device, caused by vibrations of the chain, of the actuating device and of the pinion assembly.

In a further embodiment, the actuating device may furthermore comprise program code which can be executed on a portable appliance, wherein the program code is configured to activate the portable appliance to carry out the following steps: a) receiving a user input regarding the selection of a shift stage of the multiplicity of shift stages, and b) receiving a user input regarding the setting and/or changing of the shift position parameter. In this way, the trim process can be performed using a portable appliance, in particular a smartphone with a corresponding smartphone app. For this purpose, the user can set a valid shift stage and subsequently individually change the shift position parameters for this shift stage (change the amount of trim of the shift stage) until an optimum shift position is attained.

According to a seventh aspect, the above-stated third object of the invention is achieved by means of a method for setting an actuating device according to any of the preceding aspects, wherein the method comprises the following steps: selecting a shift stage, retrieving a stored shift position parameter, which is assigned to a shift position of a movable element of the actuating device in the respective shift stage, from a memory, changing the shift position parameter, storing the changed shift position parameter in the memory. With this method, the actuating device can be individually adapted or trimmed for each shift stage. Here, the method may be carried out in particular using a portable appliance, in particular a smartphone with a corresponding app.

To further support the trim function according to the method mentioned above, provision may be made for the method to furthermore comprise the following steps:
  a. setting a selected shift stage by means of the actuating device,
  b. detecting a functional parameter of the actuating device which represents an accuracy of the shift stage setting,
  c. adjusting the shift position parameter such that the functional parameter changes in the direction of an improvement of the accuracy of the shift stage setting,
  d. storing the shift position parameter set in step c.

The functional parameter of the actuating device that represents an accuracy of the shift stage setting may in this case represent for example an oscillation or vibration of the actuating device, such that the shift position parameter is adjusted in the direction of a reduction of the vibration.

In one refinement of the described method, the control device is configured to carry out an automatic setting process, wherein the following steps are automatically performed in the setting process:
  a. setting the actuating device into a first shift stage of a multiplicity of shift stages,
  b. setting the position of the movable element to a multiplicity of positions within a predetermined interval around the shift position of the set shift stage, and detecting a vibration of the actuating device for each set position,
  c. setting the shift position parameter to a value which corresponds to the position of the movable element at which the smallest vibration has been detected,
  d. setting the actuating device into a further shift stage of the multiplicity of shift stages,
  e. repeating steps b to d until all shift stages of the multiplicity of shift stages have been set at least once.

By means of such a method, the setting process or the trimming of the actuating device can be performed in substantially automated fashion, for example during riding, in order to offer the most realistic possible conditions for the setting process.

A bicycle denoted generally by 10 in FIG. 1 has, in a manner known per se, a front wheel 12, a rear wheel 14 and a frame 16. The front wheel 12 is mounted rotatably on lower ends of a front-wheel fork 18, which at its upper end is held rotatably on the frame 16 and bears a handlebar 20 for steering the bicycle 10. The rear wheel 14 is mounted, rotatably about a rotary axle A, on a rear end of the frame 16.

The frame 16 furthermore bears a saddle 22 and a crank assembly with pedal cranks 24 and with a front chain wheel 26 fastened thereto. The crank assembly is mounted, so as to be rotatable about a pedal-crank bearing axle 28, on the frame. On the rear wheel 14, concentrically with respect to the wheel axle, there is installed a pinion assembly 30 which bears a multiplicity of pinions of different diameter, that is to say with different numbers of teeth. In the exemplary embodiment, a pinion assembly with a total of eleven pinions is provided, and the front chain wheel 26 is provided as a single wheel, such that a total of eleven shift stages can be set. In this context, use may self-evidently be made of other shift configurations, in particular also multiple chain wheels, between which shifting is possible by means of a front derailleur.

For the setting of the shift stages of the rear pinion assembly, use is made of a rear derailleur system with a rear shift mechanism 32, which is likewise fastened to a rear end of the frame 16 and forms part of the actuating device of the embodiment. A chain 34 runs around the pinion assembly 30 and the front chain wheel 26 and runs through the shift mechanism 32 in order to transmit drive force from the front chain wheel 26 to the pinion assembly 30 and thus to the rear wheel 14. The shift mechanism 32 is in this case capable of adjusting the chain 34 in an axial direction with respect to the rotary axle A of the rear wheel 14 in order to selectively align the chain 34 with one of the pinions of the pinion assembly 30 and accordingly guide said chain onto the selected pinion.

For the setting of the shift mechanism into a desired shift stage by a rider, an operator control element 36 is provided on the handlebar 20. In the exemplary embodiment illustrated, the operator control element 36 transmits control commands to the controller of the shift mechanism 32 wirelessly by means of a radio connection between a radio transmitter integrated in the operator control element 36 and a radio receiver integrated in the shift mechanism 32. However, other variants are alternatively conceivable and usable in the context of the present embodiments in order to transmit operator control commands of the rider from an operator control element to the shift mechanism 32, for example a wired transmission by means of an electrical signal line or a mechanical connection by means of a shift cable.

It is also to be noted that the bicycle preferably comprises a brake system, for example in the form of a front disk brake 38 and/or a rear disk brake 40.

Figure 2:
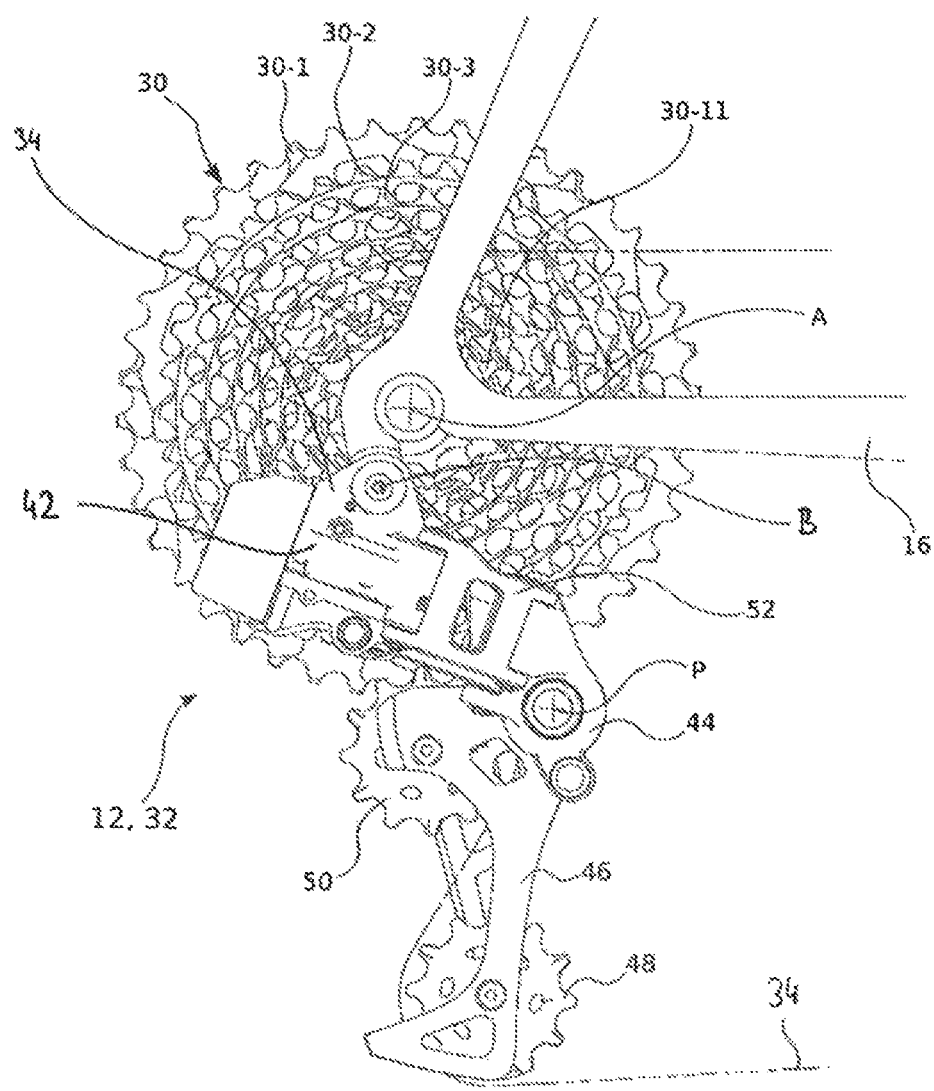
FIG. 2 shows a view of a rear shift mechanism of the bicycle of the first embodiment in a state installed on the bicycle.

FIG. 2 shows an enlarged illustration of a rear portion of a bicycle 10 in the region of the pinion assembly 30 and of the shift mechanism 32. It can be seen that the pinion assembly 30 comprises a multiplicity of pinions, in the exemplary embodiment eleven pinions 30-1 . . . 30-11, which are stacked coaxially one on top of the other in order of size on the rear-wheel axle A and are connected rotationally conjointly to one another. Here, the largest pinion 30-1 may for example have 50 teeth, whereas the smallest pinion 30-11 may for example have nine to eleven teeth. The pinions 30-1 . . . 30-11 are arranged such that the largest pinion 30-1 is situated further to the inside, that is to say closer to the central plain of the rear wheel, whereas the smallest pinion 30-11 is arranged further to the outside, that is to say further remote from the central plain. Below, directional terms such as "inside", "outside", "top", "bottom", "front", "rear", "laterally" and similar terms relate to an upright position of the bicycle 10, ready for riding, on horizontal ground. A direction from the largest pinion 30-1 towards the smallest pinion 30-11 is referred to as "outwards", whereas a direction from the smallest pinion 30-11 towards the largest pinion 30-1 is referred to as "inwards".

The shift mechanism 32 comprises a static element 42, which is also referred to as "B knuckle" and which has a fastening portion 43 for the fastening to the frame 16, preferably using a derailleur hanger. Furthermore, the shift mechanism 32 comprises a movable element 44, which is also referred to as "P-knuckle" and which, in a manner known per se, bears a chain guide arrangement 46 with a lower chain guide wheel 48 and an upper chain guide wheel 50. The chain guide arrangement 46 is held, rotatably about an axle B which is parallel to the axle A, on the movable element 44, and is preloaded in a backward direction, that is to say clockwise in FIG. 2, by a spring (not illustrated) in order to hold the chain 34 under tension and in particular compensate for the different chain running distances around the pinions 30-1 . . . 30-11 of different size.

Figure 3:
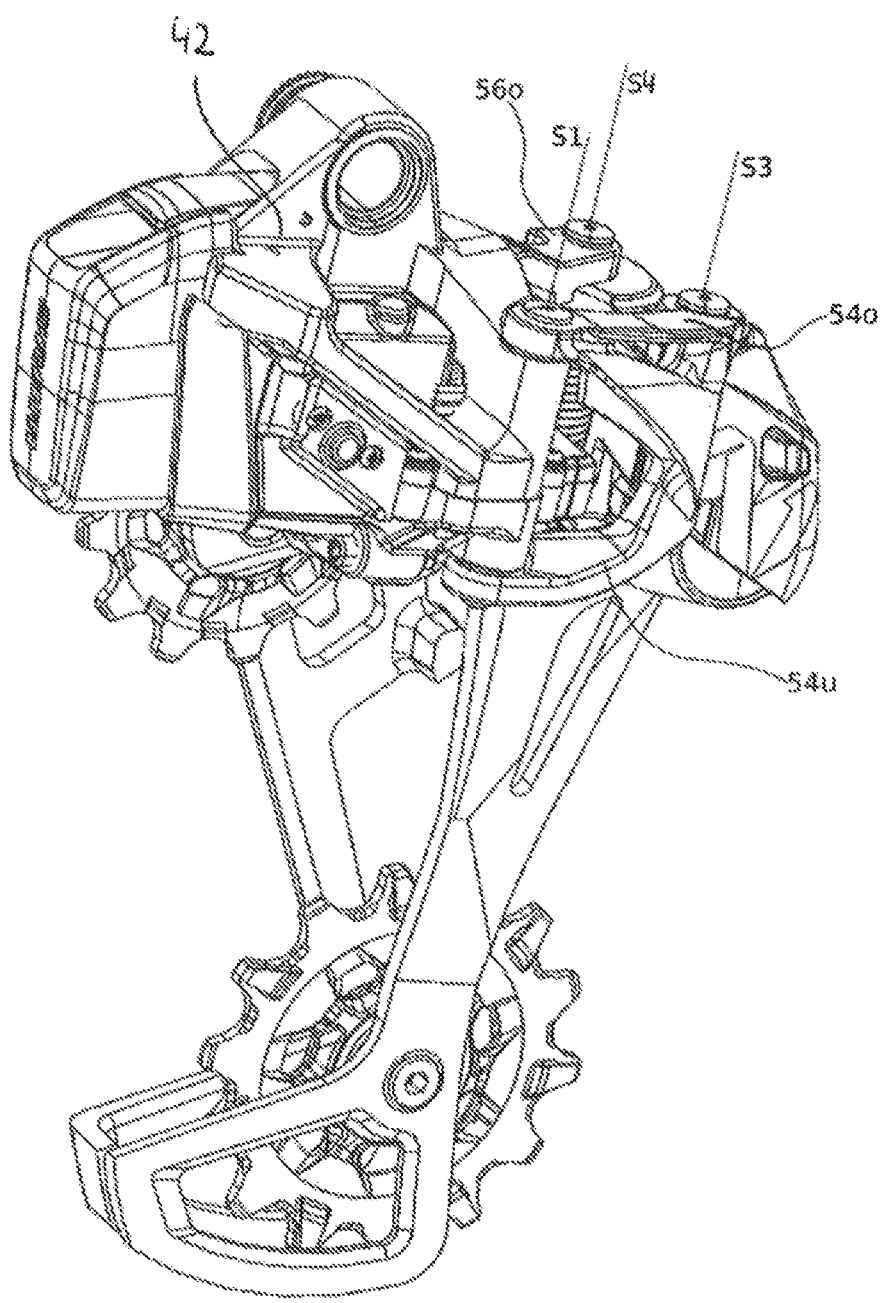
FIG. 3 shows a perspective view of the shift mechanism of the first embodiment.
Figure 4:
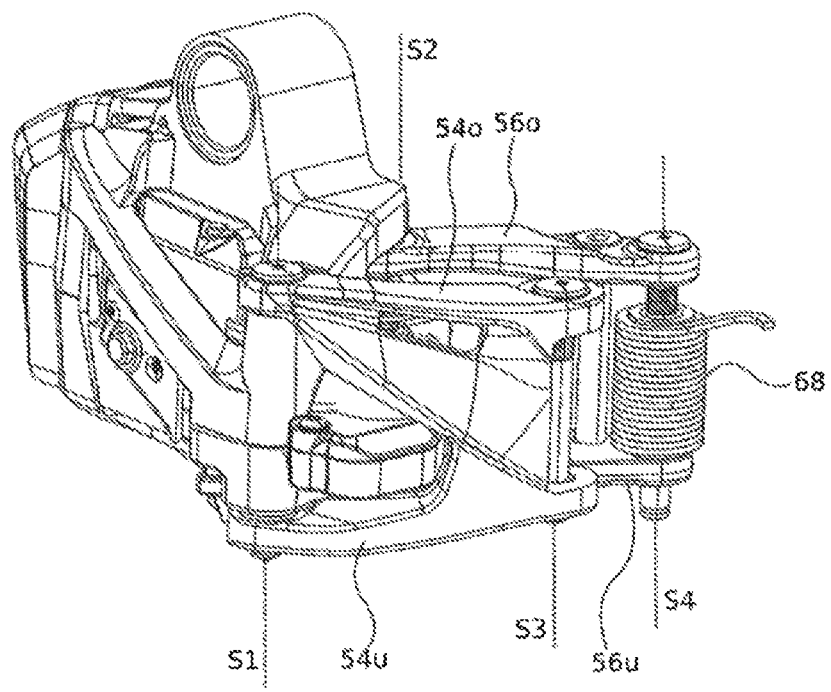
FIGS. 4-6 show various perspective views of the shift mechanism of the first embodiment, wherein some components of the shift mechanism have been omitted for the purposes of the illustration.
Figure 5:
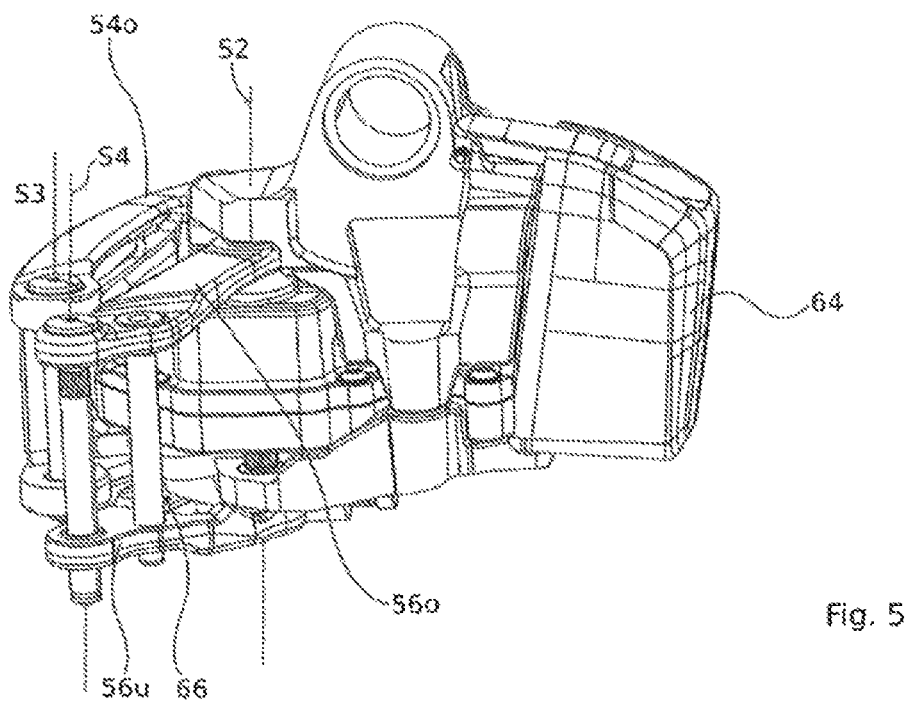

The movable element 44 is coupled movably to the static element 42 by means of a joint arrangement 52. The joint arrangement 52 can be clearly seen in particular in FIGS. 3 to 5 and may, as in the exemplary embodiment, be of parallelogram-type design. Such a joint arrangement 52 comprises at least one outer pivot element, in this case an upper outer pivot element 54o and a lower outer pivot element 54u, and at least one inner pivot element, in this case an upper inner pivot element 56o and a lower inner pivot element 56u. First ends of the upper and lower outer pivot elements 54o, 54u are mounted pivotably on the static element 42 at a first pivot axle S1. First ends of the upper and lower inner pivot elements 56o, 56u are mounted pivotably on the static element 42 at a second pivot axle S2 which is spaced apart from the first pivot axle. Second ends, situated opposite the first ends, of the upper and lower outer pivot elements 54o, 54u are mounted pivotably on the movable element 44 at a third pivot axle S3. Second ends, situated opposite the first ends, of the upper and lower inner pivot elements 56o, 56u are mounted pivotably on the movable element 44 at a fourth pivot axle S4 which is spaced apart from the third pivot axle S3. The pivot axes S1, S2, S3 and S4 form substantially the corner points of an articulated parallelogram and, in this way, permit a movement of the movable element 44 and thus of the chain guide arrangement 46 in an axial direction (parallel to the main axle A) outward and inward in order to guide the chain 34 from one of the pinions 30-1 . . . 30-11 to another pinion.

Figure 6:
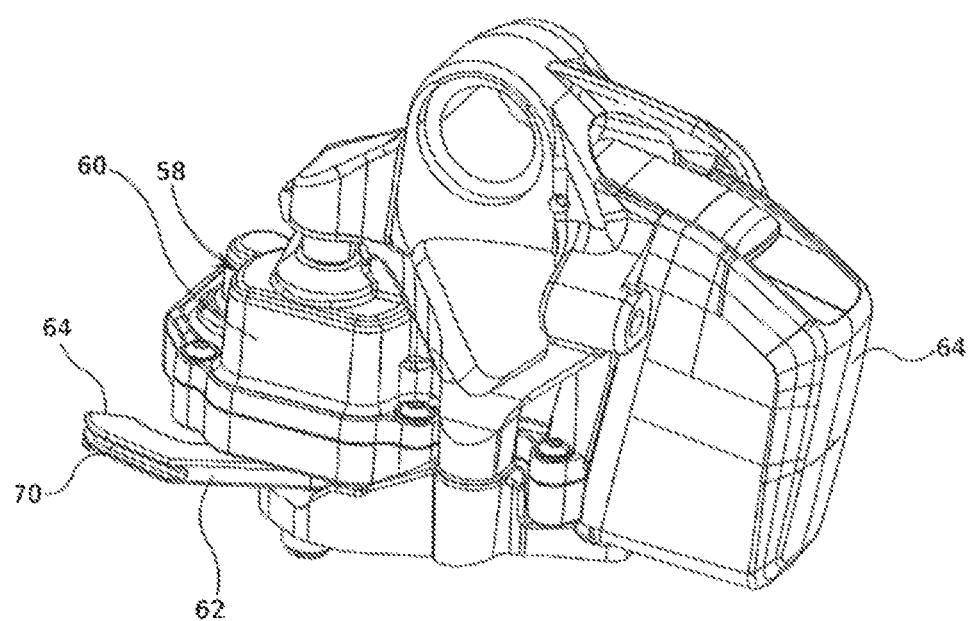

The movable element 44 is moved by an electromechanical drive 58 (see also FIG. 6) which has a motor-gearing assembly accommodated in a housing 60 and which provides force for moving the movable element at an output member which is coupled to the joint arrangement 52 or to the movable element 44 in movement-transmitting fashion. In the exemplary embodiment, the output member is formed by a drive arm 62 which has a stop 64 which is in abutting contact with a counterpart stop 66 (see FIG. 5, drive arm 62 omitted here for the purposes of the illustration) of the lower inner pivot element 56u, such that said stop is capable of pivoting the lower inner pivot element 56u in an outward direction and thus causing an outward movement of the movable element 44. Furthermore, the drive arm 62 is held in abutting contact with the lower inner pivot element 56u under the stress of a spring 68, wherein the spring 68 is supported at one side in a receptacle 70 on the drive arm 62 and at the other side on the movable element 44. The spring 68 may in particular be held on the fourth pivot axle S4 and configured so as to preload the movable element 44 in an inward direction.

In order to shift the shift mechanism 32 in the direction of a smaller pinion, that is to say in order to move the chain guide arrangement 46 in an outward direction, the electromechanical drive 58 is operated such that the drive arm 62 moves in an outward direction and, in so doing, by means of the stop 64 and the counterpart stop 66, directly concomitantly drives the inner pivot element 56u. In order to shift the shift mechanism 32 from a relatively small pinion in the direction of a larger pinion, that is to say in order to move the chain guide arrangement 46 in an inward direction, the electromechanical drive 58 is operated such that the drive arm 62 moves in an inward direction. Owing to the force of the spring 68, the joint arrangement 52 is closed to follow this movement of the drive arm 62, that is to say the spring 68 holds the counterpart stop 66 of the lower inner pivot element 56u in abutting contact with the stop 64 of the drive arm 62. By means of the rotation of the output element of the electromechanical drive 58 and thus the pivoting movement of the drive arm 62, it is thus possible for the position of the chain guide arrangement 46 to be directly influenced and for a desired shift position corresponding to a desired shift stage to be assumed.

Figure 7:
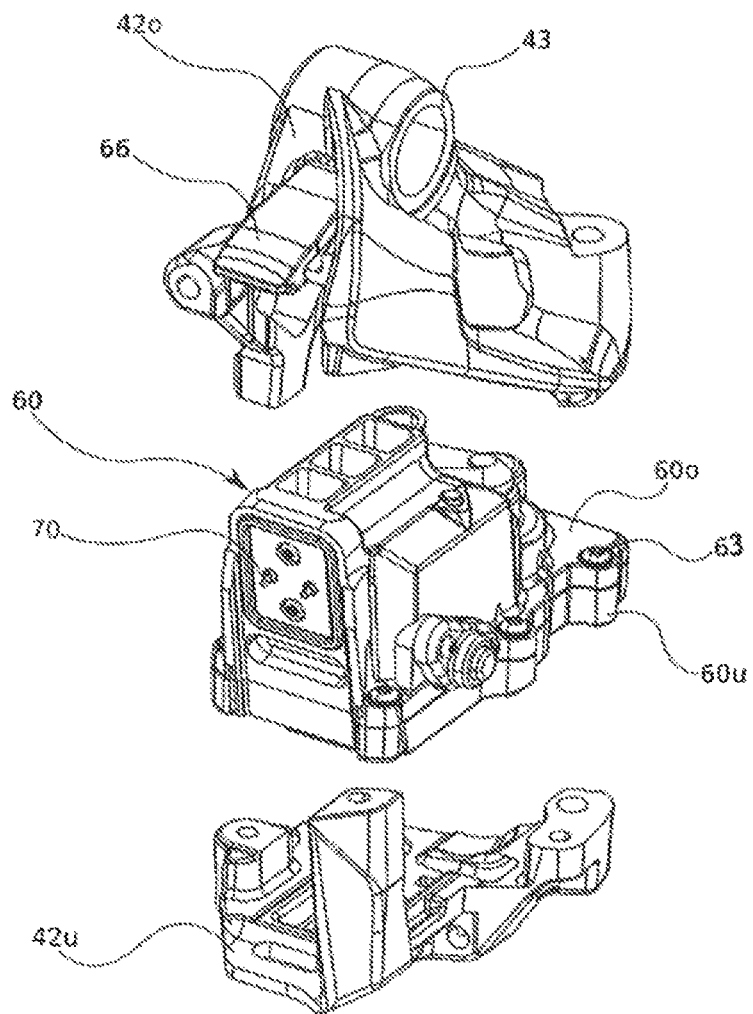
FIG. 7 shows an exploded view of a part of the shift mechanism of the first embodiment.
Figure 8:
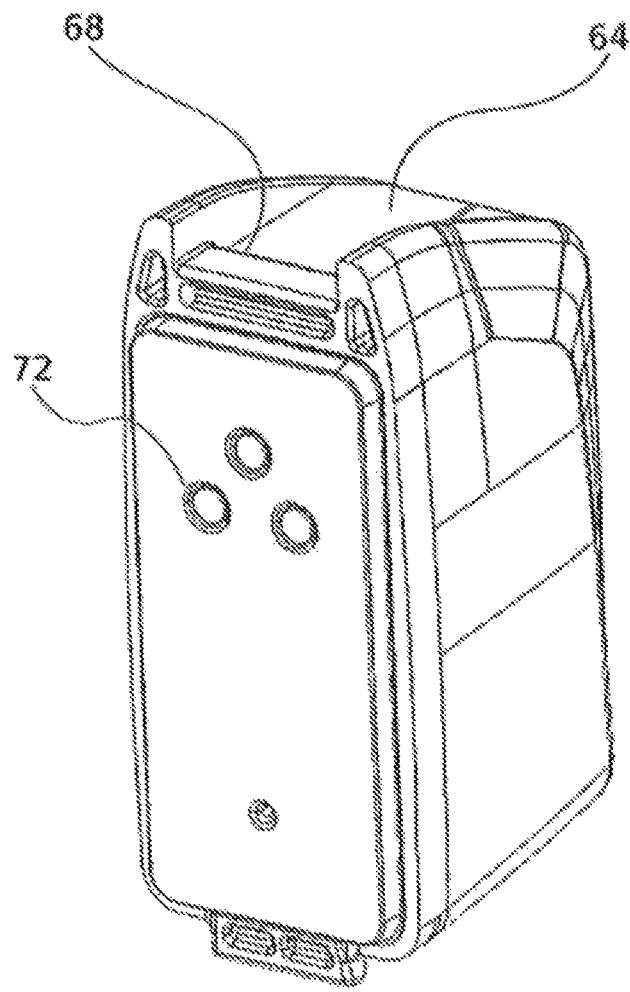
FIG. 8 shows a battery of the rear shift mechanism of the first embodiment.
Figure 9:
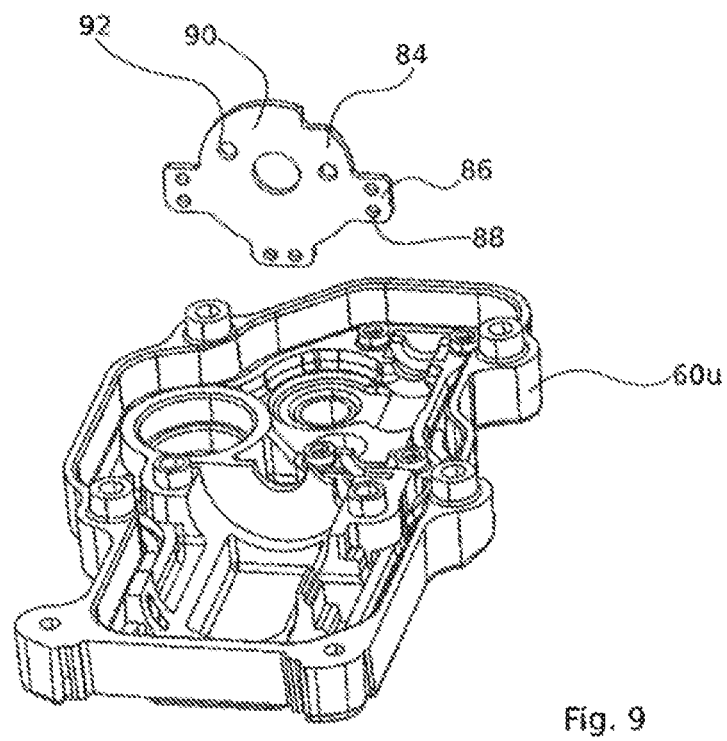
FIGS. 9-12 show perspective illustrations of the lower gearing housing part, illustrating the step-by-step installation of a motor carrier and of a motor of the embodiment.
Figure 10:
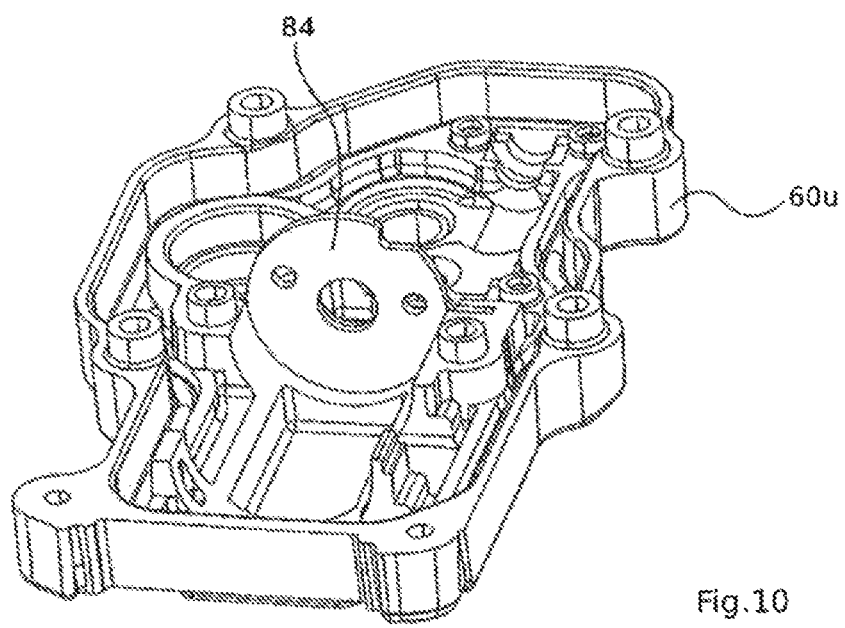
Figure 11:
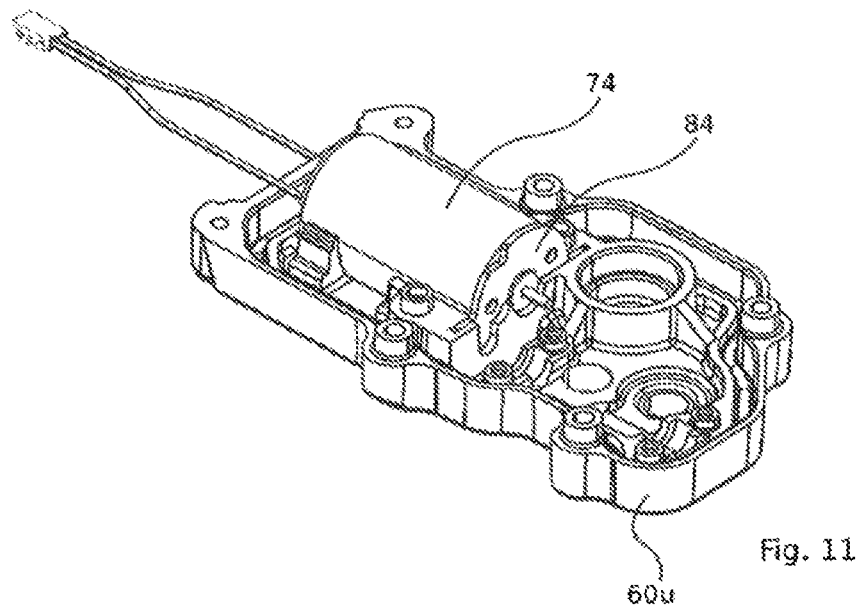
Figure 12:
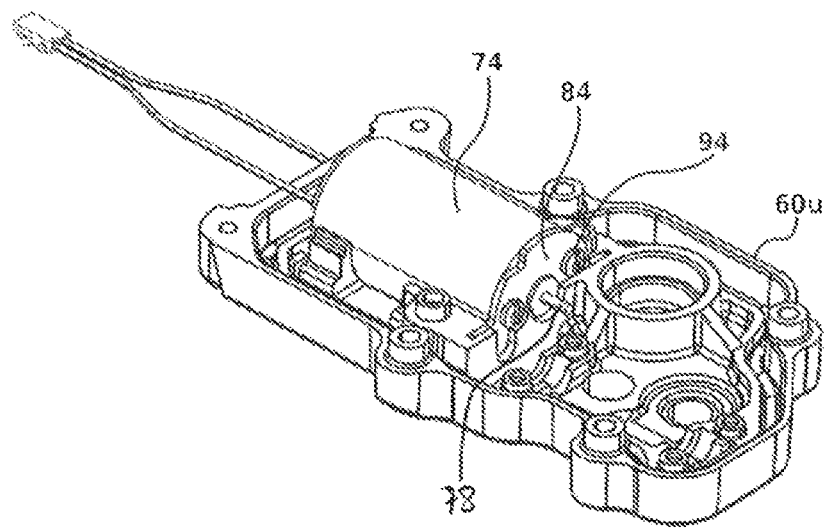

FIG. 7 shows that the gearing housing 60 of the electromechanical drive 58 is, in the exemplary embodiment illustrated, formed from an upper gearing housing part 60o and a lower gearing housing part 60u, which are fastened to one another by suitable connecting means, in this case screw connections 63, and which in their interior define a cavity for receiving the motor-gearing arrangement, which is to be described further below. The gearing housing 60 may in turn be accommodated between two housing parts of the static element, for example between an upper housing part 42o, on which the fastening portion 43 for the fastening to the frame 16 is also arranged, and a lower housing part 42u. The upper housing part 42o and the lower housing part 42u may be screwed together in order to fix the gearing housing 60 securely and without play in an exactly predetermined position.

Energy for operating the electromechanical drive 58 is, in the exemplary embodiment illustrated, provided by a removable battery 64. The battery 64 and gearing housing 60 are both mechanically and electrically able to be coupled to one another and separable from one another. Mechanical connecting means may be formed for example by a hook 66 which engages into a suitable depression 68 of the battery or vice versa. Electrical connecting means may be realized by means of suitable pins 70 and matching apertures 72. Alternatively, a supply may be provided to the electromechanical drive 58 by means of an energy source arranged at a remote location, which is connected to the drive 58 by means of an electrical cable.

Figure 13:
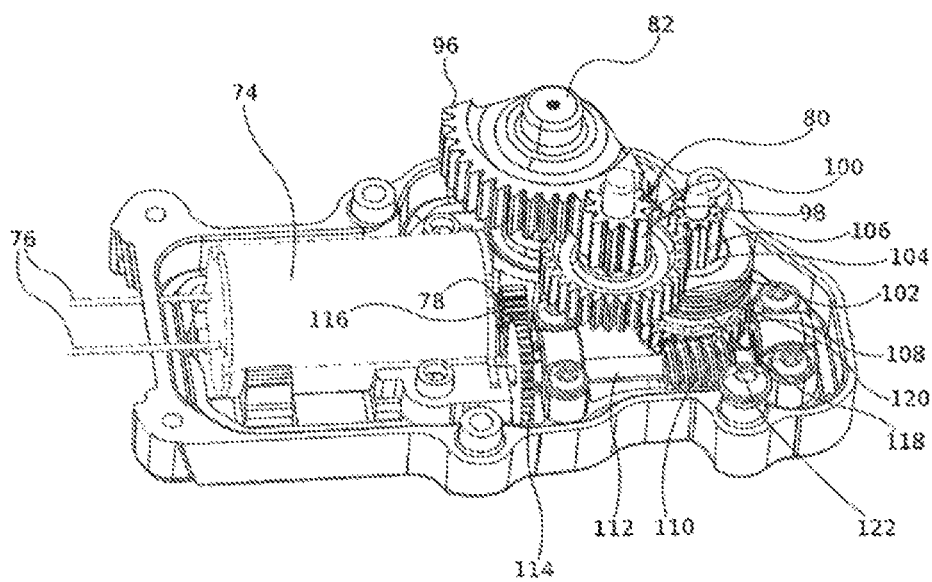
FIGS. 13-14 show perspective views of a lower gearing housing part and of the motor and of a gearing of the actuating device of the embodiment, wherein individual elements have been omitted for the purposes of the illustration.
Figure 14:
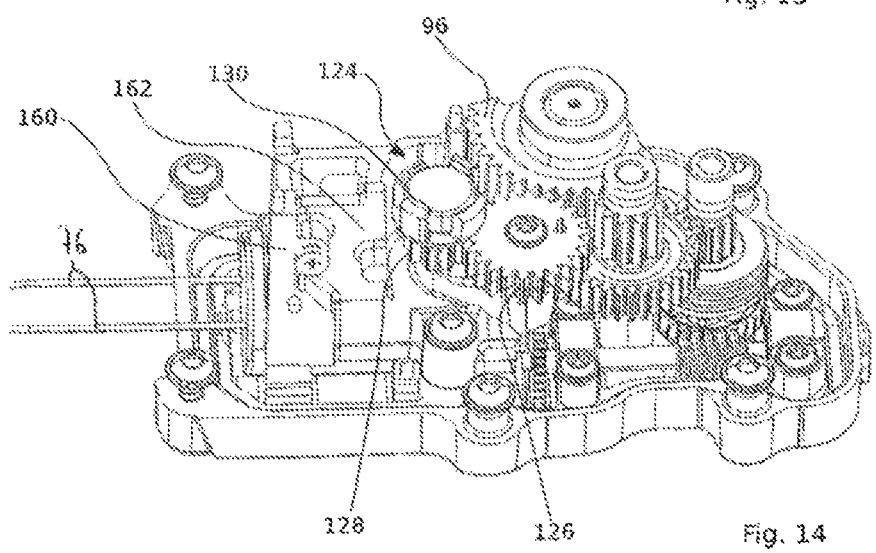
Figure 15:
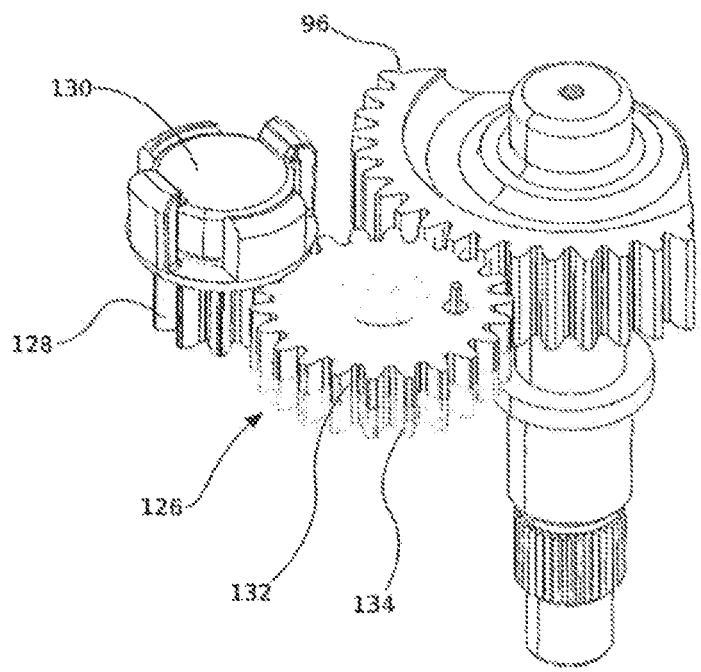
FIG. 15 shows a perspective view of a position detection device according to the embodiment of the invention.

FIG. 13 shows an internal construction of the electromechanical drive 58, in particular a motor-gearing assembly, wherein certain parts have been omitted in FIG. 13 for the purposes of a better illustration. The motor-gearing assembly comprises in particular a motor 74, with electrical connectors 76 for the application of a motor voltage, and a motor output shaft 78. The fast rotation of the electric motor 74 is converted by means of a gearing 80 into a slow rotation of a gearing output shaft 82, which drives the drive arm 62 and which may in particular be held rotationally conjointly with the drive arm.

Referring to FIGS. 9 to 12, the installation of the electric motor 74 on the gearing housing 60, in particular on the lower gearing housing part 60u, will firstly be discussed in more detail.

In the embodiment, a motor carrier in the form of a carrier plate 84 is provided, which, in a first step, is to be fastened to the lower gearing housing part 60u. Here, the carrier plate 84 is formed preferably from a metal and therefore exhibits high mechanical strength. By contrast, the gearing housing 60 is composed of a material of relatively low weight, in particular of plastic.

The carrier plate 84 is, for secure installation on the lower gearing housing part 60u, at least partially embedded into the plastics material of the lower gearing housing part 60u. The embedding of the carrier plate 84 may be performed during the production of the lower gearing housing part 60u, for example during an injection molding process, or retroactively after the solidification of the lower gearing housing part 60u. Preferably, the carrier plate 84 has at least one projection 86 which is embedded into the plastics material of the lower gearing housing part 60u.

To further promote a particularly intimate connection between the carrier plate 84 and the plastics material of the lower gearing housing part 60u, it is furthermore possible for at least one passage opening or aperture 88 to be provided in the at least one projection 86, into which passage opening or aperture plastics material can at least partially ingress. Alternatively or in addition, use may be made of adhesives, and the carrier plate 84 may be adhesively bonded with its at least one projection 86 in a corresponding aperture of the lower gearing housing part 60u.

Irrespective of the fastening variant, an installation portion 90 of the carrier plate 84 remains free in the installed state, and is accessible for the installation of the motor 74. In particular, the installation portion 90 has second fastening means 92 for the fastening of the motor 74 to the carrier plate 84. In the exemplary embodiment, the second fastening means 92 are realized by means of holes at which the motor 74 can be screwed on by means of screws 94. The installation portion 90 is in this case preferably of plate-like form and, in the installed state, bears areally against a plate-like portion of the motor 74, for example against a face side of the motor 74, at which the motor output shaft 78 also emerges. Reliable, stable and highly precise positioning of the motor and in particular of the motor output shaft 78 is achieved in this way. At the same time, the installation of the motor 74 can be performed in a relatively simple installation process by way of the second fastening means 92.

Referring to FIGS. 13 to 17, the gearing 80 will be discussed in more detail below. Here, in the figures, certain components have again been omitted for the purposes of the illustration. Fixedly connected to the gearing output shaft 78 is a first gearing wheel 96, which, for reasons of space, is in the form of a segment wheel, such that it has a toothing only over its operating angle and is cut away in other circumferential portions. The first gearing wheel 96 is in engagement with a small wheel 98 of a first stepped wheel 100. Connected rotationally conjointly to the small wheel 98 of the first stepped wheel 100 is a large wheel 102 of the first stepped wheel 100, which large wheel is in turn in engagement with a small wheel 104 of a second stepped wheel 106. A large wheel 108 of the second stepped wheel 106 is formed as a worm wheel and is in engagement with a worm 110 which is arranged rotationally conjointly on a worm shaft 112. The axis of rotation of the first gearing wheel 96, of the first stepped wheel 100 and of the second stepped wheel 106 are preferably oriented parallel to one another, whereas the worm shaft 112 runs preferably at an angle of 90° with respect to the axis of rotation of the second stepped wheel 106.

The worm shaft 112 furthermore bears a third gearing wheel 114, which is in turn in engagement with a force gearing wheel 116, which is arranged rotationally conjointly on the motor output shaft 78. The third gearing wheel 114 is preferably larger than the fourth gearing wheel 116.

As a result, in the gearing 80 of this exemplary embodiment, the fast rotation of the gearing output shaft 78 is converted by means of the fourth gearing wheel 116, the third gearing wheel 114, the worm shaft 112, the worm 110, the large wheel 108 of the second stepped wheel 106, the small wheel 104 of the second stepped wheel 106, the large wheel 102 of the first stepped wheel 100, the small wheel 98 of the first stepped wheel 100 and the gearing wheel 96 into a slower rotation of the gearing output shaft 82. A multi-stage speed reduction is thus realized. The structural form of the gearing 80 is to be understood here as an example, and use may alternatively be made of gearings with more or fewer gearing stages or with different speed reduction mechanisms, as long as they are suitable for adequately adapting the rotational speed of the motor 74 to the desired rotational speed of the gearing output shaft 82.

The gearing 80 may furthermore have an overload clutch 118, which may be arranged at a suitable position in the above-described force path from the motor output shaft 78 to the gearing output shaft 82. Accordingly, it is for example possible for the small and large wheels of the stepped wheels, which in the normal situation are connected rotationally conjointly to one another for the purposes of transmitting rotational force, to be mounted so as to be rotatable relative to one another in the case of one of the stepped wheels. In the present exemplary embodiment, this is realized in the case of the second stepped wheel 106, and the overload clutch 118 is arranged between the small wheel 104 and the large wheel 108 of the second stepped wheel 106. The overload clutch 118 may for example be in the form of a slipping clutch and may have a first clutch disk 120, which is fixedly connected to the small wheel 104 of the second stepped wheel 106, and a second clutch disk 122, which is fixedly connected to the large wheel 108 of the second stepped wheel 106. The first clutch disk and the second clutch disk are in frictional engagement with one another such that they transmit rotational force if a differential torque acting between the first clutch disk 120 and the second clutch disk 122 is lower than a predetermined overload torque, and rotate relative to one another if the differential torque is greater than the predetermined overload torque. The overload torque is preferably settable. It is self-evidently possible for the overload clutch 118 to alternatively or additionally be provided on the first stepped wheel 100 rather than on the second stepped wheel 106.

The gearing 80 may furthermore have a position detection mechanism 124 which detects a present position or rotational position of the gearing 80. In the present exemplary embodiment, the position detection mechanism 124 detects a rotational position of the first gearing wheel 96. For this purpose, the position detection mechanism 124 may have a second gearing wheel 126, which is likewise in engagement with the first gearing wheel 96 and secondly in turn in engagement with a fifth gearing wheel 128, which bears a position sensor 130. Preferably, the axes of rotation of the first gearing wheel 126 and of the fifth gearing wheel 128 are in turn parallel to the axis of rotation of the gearing output shaft 82.

The position sensor 130 may also be an encoder known per se, which magnetically or optically interacts with a reader head (not illustrated), which is held fixedly with respect to the housing, in order to detect the rotational position of the fifth gearing wheel 128 in particular in contactless fashion. It is accordingly important for the rotational position of the fifth gearing wheel 128 to be able to be assigned as exactly as possible to a particular rotational position of the first gearing wheel 96. This gives rise to the requirement to reduce any play in the transmission path from the fifth gearing wheel 128 to the first gearing wheel 96. According to one embodiment, for this purpose, use is made of an anti-plate mechanism, which will be discussed in more detail below with reference to FIGS. 15 and 16.

The anti-play mechanism is realized, in the exemplary embodiment, by means of the second gearing wheel 126, which comprises two partial wheels 132, 134 which are held coaxially with respect to one another. The two partial wheels, an upper partial wheel 132 and a lower partial wheel 134, have the same number of teeth and are both simultaneously in engagement both with the first gearing wheel 96 and with the fifth gearing wheel 128. The partial wheels 132, 134 are rotatable relative to one another about the axis of rotation of the second gearing wheel 126.

The relative rotation of the partial wheels 132, 134 is in this case preloaded by a force which, in the present exemplary embodiment, is generated by an anti-plate spring 136. The anti-plate spring 136 is preferably in the form of a torsion spring and engages with one end 138 on the upper partial wheel 132, whereas its opposite end (not illustrated) engages on the lower partial wheel 134. It is preferable here for the major part of the anti-play spring 136 to be accommodated in space-saving fashion in a cavity 140 which is formed between the upper partial wheel 132 and the lower partial wheel 134. For this purpose, the upper partial wheel 132 may have a first aperture 142 which faces towards the lower partial wheel 134 and which may be in the form of a circular or ring-shaped depression. Alternatively or in addition, the lower partial wheel 134 may have a second aperture 144 which faces towards the upper partial wheel 132 and which may be in the form of a circular and ring-shaped depression. The engagement of the end 138 of the spring 136 with the upper partial wheel 132 may be realized by insertion of the end 138 into an opening 146 of the upper partial wheel 132. Correspondingly, the other end (not illustrated) of the anti-play spring 136 may be held in engagement with the lower partial wheel 134.

If the second gearing wheel 126 is in engagement with the first gearing wheel 96 and with the fifth gearing wheel 128, then the flanks of the partial wheels 132, 134 bear closely against the flanks of the toothings of the first gearing wheel 96 and of the fifth gearing wheel 128 owing to the bracing force of the anti-play spring 136, such that play between the gearing wheels is reduced.

Figure 16:
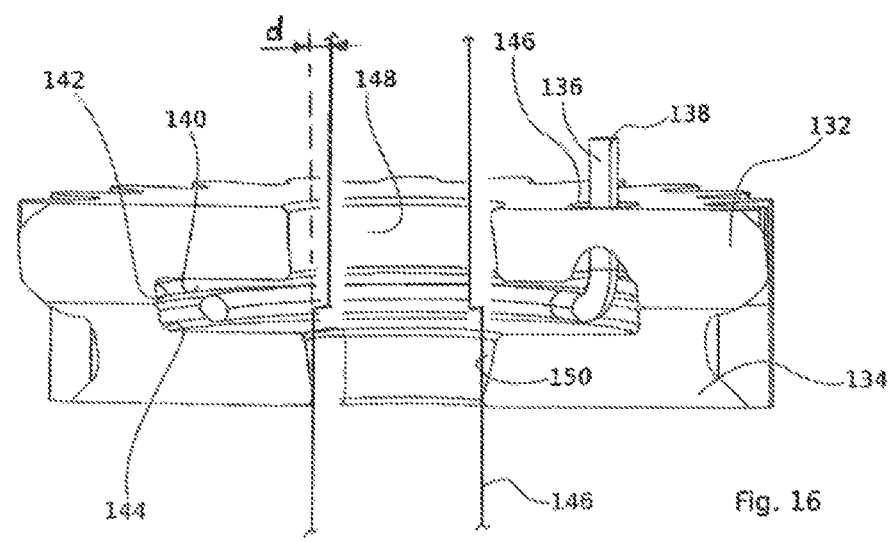
FIG. 16 shows a cross-sectional view of a second gearing wheel of the embodiment in a sectional view which encompasses the axis of rotation.

With a further preferred feature, which is likewise illustrated in FIG. 16, the anti-play mechanism of this exemplary embodiment can yet further reduce the play between the first gearing wheel 96 and the fifth gearing wheel 128. In FIG. 16, it can be seen that the lower partial wheel 134 is held on a gearing shaft 146 of the second gearing wheel 126 with a smaller degree of play than the upper partial wheel 132. In particular, the lower partial wheel 134 may be held rotationally conjointly, or rotatably substantially without play, on the gearing shaft 146, whereas the upper partial wheel 132 is mounted with a predetermined amount of play d relative to the gearing shaft 146. This may be realized by means of a gearing shaft with different diameters in different portions, wherein the gearing shaft 146 has a smaller diameter in an upper axial portion, on which the upper partial wheel 132 is mounted, than in a lower axial portion, on which the lower partial wheel 134 is mounted. Alternatively, it would conversely be possible for the gearing shaft 146 to have a larger diameter in the upper axial portion than in the lower axial portion, such that, instead of the upper partial wheel 132, the lower partial wheel 134 then has a radial degree of play on the gearing shaft 146.

In a variant which is not illustrated, it would be possible for a diameter of an upper central receiving opening 148 of the upper partial wheel 132, in which the gearing shaft 146 is received, to be larger than a diameter of a lower central receiving opening 150 of the lower partial wheel 134, at which the lower partial wheel 134 is mounted on the gearing shaft 146. Here, it is self-evidently also possible for the diameter relationships of the central openings 148, 150 to be reversed, such that, instead of the upper partial wheel 132, it is then the lower partial wheel 134 that has a radial degree of play on the gearing shaft 146.

The result of a degree of play d of the above-described type is a predetermined radial degree of play of the upper partial wheel 132 relative to the gearing shaft 146 and thus also relative to the lower partial wheel 134.

Here, the radial movement may likewise be preloaded by the force of the anti-play spring 136, such that the anti-play spring 136 inherently has a dual function. By means of the additional radial play d, an even better fit between the upper partial wheel 132 and the first gearing wheel 96 and also the fifth gearing wheel 128 can be achieved, resulting in an additional play reduction. It is however to be noted that it has been possible to identify that, even without the additional feature of a radial degree of play of one of the two partial wheels 132, 134, a very good and significant play reduction can be achieved already by means of the relative rotation of the two partial wheels 132, 134.

Figure 17:
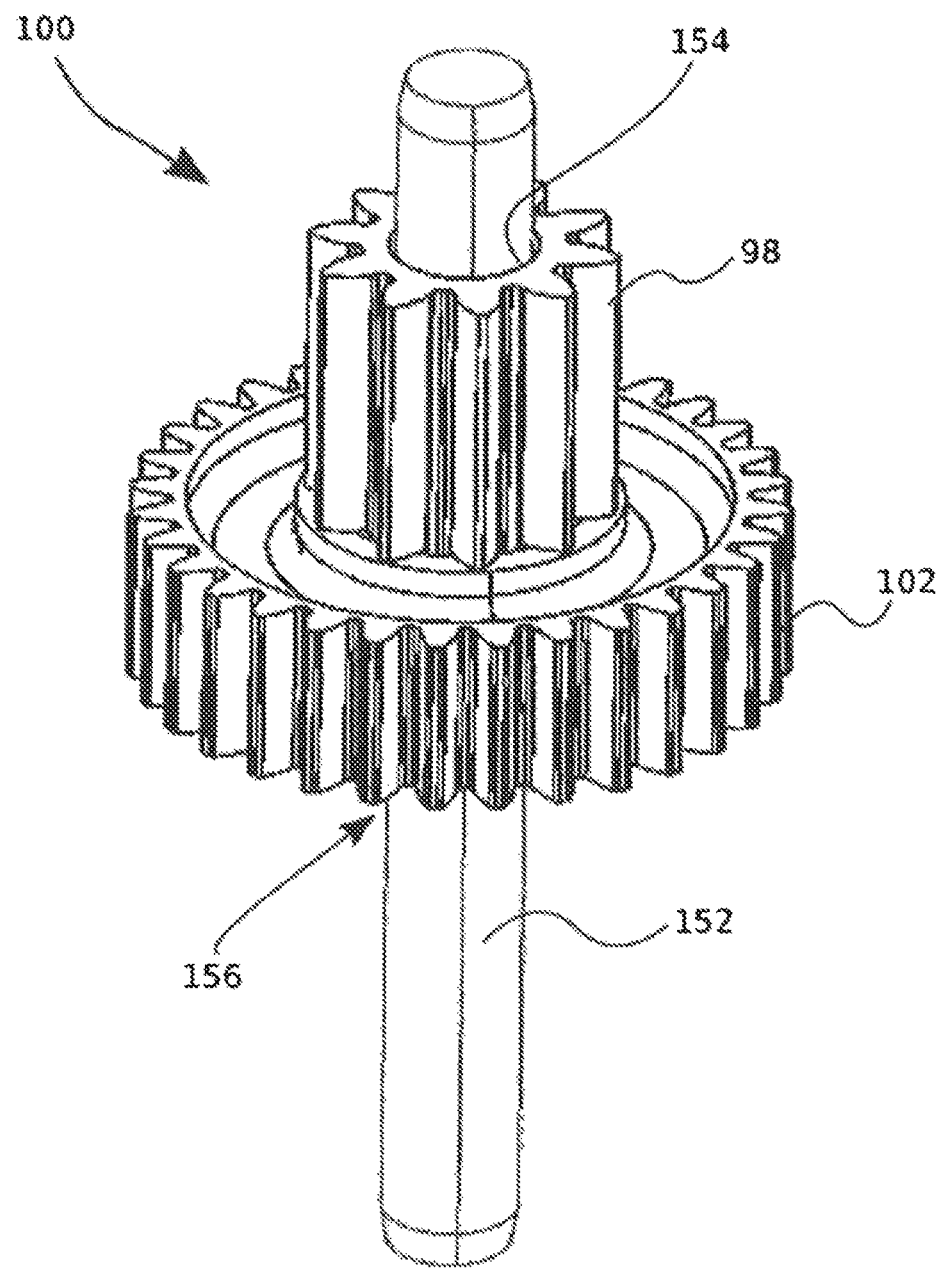
FIG. 17 shows a perspective view of a stepped toothed wheel of the embodiment of the invention.

FIG. 17 shows the construction of the first stepped wheel 100. According to one embodiment, the small wheel 98 and the large wheel 102 may each be formed separately from a gearing shaft 152 which forms the rotary axle of the first stepped wheel 100. This means that the small wheel 98 has a passage opening 154, through which the gearing shaft 152 is led, and the large wheel 102 has a passage opening 156, through which the gearing shaft 152 is likewise led. The small wheel 98 and the large wheel 102 are held rotationally conjointly relative to one another and may be produced as separate components and fastened to one another or formed as a single piece as an integral structural body. The small wheel 98 and large wheel 102 are preferably held rotatably on the gearing shaft 152, such that the gearing shaft 152 can be fastened in the housing.

The described design makes it possible for the small wheel 98 and the large wheel 102 to be produced from a material which differs from the material of the gearing shaft 152. For example, the small wheel 98 and large wheel 102 may be produced from a hardened steel in order to transmit high torques and in order to reduce the wear of the teeth of the wheels, whereas the gearing shaft 152 may be formed from a non-hardened steel in order to counteract hardening distortion of the gearing shaft 152. The features described above with regard to FIG. 17 may alternatively or additionally be realized on the second stepped wheel 106 or on another stepped wheel of the gearing 80.

In the manner described above, rotational force of the motor 74 is converted by means of the gearing 80 and the joint arrangement 52 into a movement of the movable element 44 in order to adjust the shift mechanism 32 for the purposes of setting the desired shift stage. The activation of the motor 74 is performed here by an electronic control device 160, which can be seen schematically in FIG. 14. The electronic control device 160 is connected to the electrical connectors 76 (even though, in FIG. 14, the electrical connectors 76 have been illustrated in the separated state, and as leading away from the electronic control device 160, for the purposes of the illustration) in order for a motor voltage U to be applied to the motor 74. The operation of the electric motor 74 may in this case be realized in a known manner, for example by means of PWM control (pulse width modulation control). The electronic control device 160 is furthermore supplied with electrical energy from the battery 64 via the contacts 70, 72. Furthermore, the electronic control device 160 has receiving means 162 for receiving control commands from the operator control element 36 or from another appliance. Here, use may basically be made of signal transmission means that are known per se, for example a connection using an electrical cable or, preferably, wireless data transmission. In the latter case, the receiving means 162 may comprise a radio receiver which is configured to receive radio signals from a radio transmitter of the operator control element 36. In particular, use may be made here of wireless control such as is known from US 2014/0102237 A1.

Figure 18:
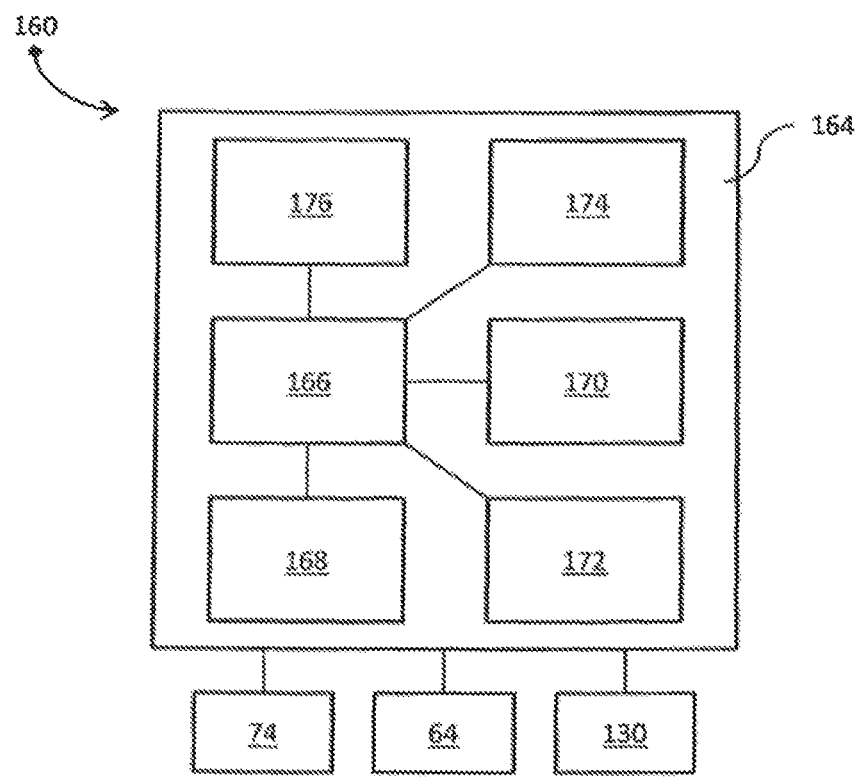
FIG. 18 shows a block circuit diagram of an electronic control device according to the embodiment of the invention.

FIG. 18 shows, as a schematic block diagram, an example of an electronic control device 160 of the type described above, which is implemented on a printed circuit board 164 and is electrically connected to the motor 74, to the battery 64 and to the position sensor 130. The printed circuit board 164 is preferably likewise accommodated in the gearing housing 60. It is preferable for a CPU 166, and a memory 168 connected to the CPU 166, to be installed on the printed circuit board 164. The printed circuit board 164 may furthermore bear a radio module 170, which forms receiving means 162 of the type described above. Furthermore, the printed circuit board 164 may bear an acceleration sensor 172 which can detect a vibration or movement of the shift mechanism 32 and transmit a corresponding signal to the CPU 166. Furthermore, a function switch 174 for switching the electronic control device 160 between different operating modes, for resetting, for switching on and off or the like may be attached to the printed circuit board 164. Furthermore, a display element, for example in the form of an LED 176, may be installed on the printed circuit board 164 and connected to the CPU 166 in order to visually signal operating states of the electronic control device 160.

Figure 19:
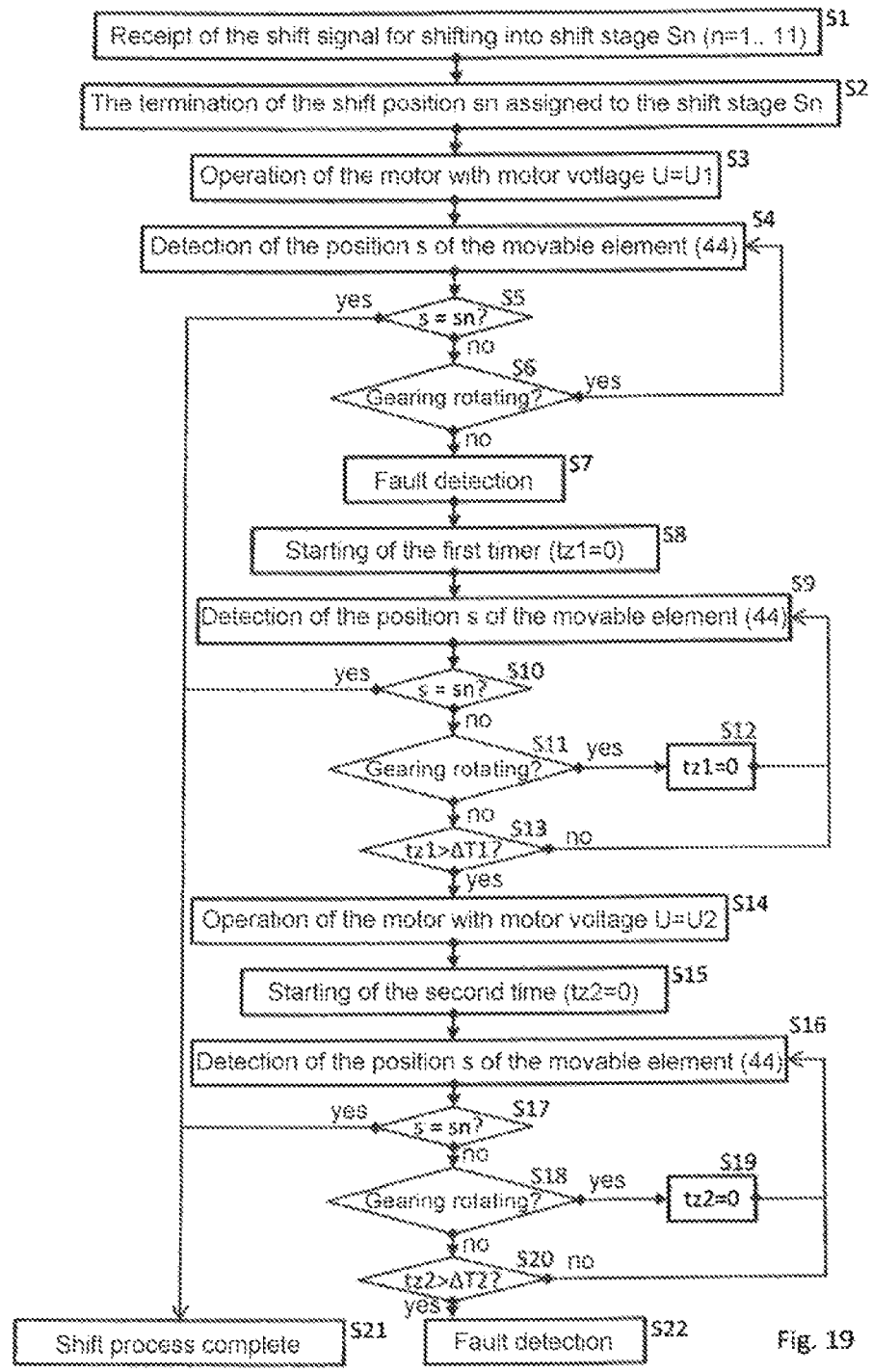
FIG. 19 shows a flow diagram showing a method for the control of the actuating device of the embodiment.

Referring to FIG. 19, a method for controlling the actuating device 10 according to the exemplary embodiment will be discussed in more detail below. The method may in particular be implemented by means of a program which is executed in the CPU 166.

In a first step S1, the radio module 170 receives a shift stage selection signal, for example the shift signal from a rider for setting the shift mechanism into a particular shift stage Sn, selected from the number of available shift stages (eleven shift stages in the exemplary embodiment). In a subsequent step S2, the electronic control device 160 determines a shift position sn assigned to the shift stage Sn. For this purpose, the CPU 166 may read out a shift table stored in the memory 168, which shift table contains an assigned shift position for each available shift stage.

In a subsequent step S3, the motor 74 is operated with a motor voltage U1, and then, in the step S4, the actuating device 10 detects the position s of the movable element 44. In particular, the position s may be determined from an output of the position sensor 130 which represents the rotational angle position of the first gearing wheel 96. If it is identified in step S5 that the position s of the movable element has reached the shift position sn of the desired shift stage Sn, then in step S21, the shift process is complete. This corresponds to the case in which it has been possible to successfully perform the shift process.

If it is identified in step S5 that the position s of the movable element has not yet reached the shift position sn, then it is checked in step S6 whether the gearing is rotating, which may preferably likewise be performed by interrogation of the position sensor 130, for example by interrogation of a change with respect to time of the output of the position sensor 130. If the gearing is not rotating (despite the shift position sn having not yet been reached), then the method concludes that a fault is present (step S7), said fault being caused for example by blockage of the movable element 44, by excessive wear or the like. By contrast, if the gearing is still rotating (S6 YES), then the method returns to step S4. The steps S4 to S6 thus form a waiting loop for fault detection, in which the position s of the movable element is repeatedly interrogated and it is determined whether the movable element reaches the desired shift position at some point in time or whether a fault occurs.

If a fault is detected, then, in the step S8, the method starts a first timer tz1, that is to say tz1 is set to zero. Subsequently, in the step S9, the method detects the position s of the movable element 44 again and subsequently checks, in step S10, whether or not the shift position sn has been reached in the intervening time. If the shift position sn has not been reached, then the method ends in step S21. If the shift position has not yet been reached, then it is checked again in step S11 whether the gearing is presently rotating. If the gearing remains at a standstill (S11 NO), then it is checked in step S13 whether or not the time tz1 measured by the first timer has already exceeded a predetermined first duration ΔT1. If the first duration ΔT1 has not yet been exceeded, then the method returns to step S9, that is to say detects the position s of the movable element 44 again and interrogates a rotation of the gearing, wherein the motor continues to be operated with the motor voltage U1. If the gearing moves again in the intervening time (S11 YES), then in step S12, the timer tz1 is reset to zero, because the method now assumes that the fault has been eliminated and, after a certain period of time, the shift position sn is reached (S10 YES).

By contrast, if it is identified in step S13 that the first duration ΔT1 has been exceeded, that is to say it has not been possible to successfully complete the shift process even after the expiry of a time ΔT1 after detection of the fault (S13 YES), then in a subsequent step S14, the motor is operated with a second motor voltage U2 which is lower than the first motor voltage U1. In particular, the motor voltages U1 and U2 are adapted to a limit voltage Uc of the overload clutch 118. The limit voltage Uc of the overload clutch is the voltage with which the electric motor 74 must be operated in order, in a situation in which the gearing output shaft 82 is blocked, to just trigger the overload clutch 118. This means that, in the case of the motor 74 being operated with the limit voltage Uc and in the case of a blocked gearing output shaft 82, precisely the overload torque acts at the overload clutch 118. U1 is now selected such that U1 is greater than Uc. U2 is selected such that U2 is less than Uc.

The method then continues to step S15, and starts a second timer tz2, that is to say sets the latter to 0. It is self-evident that the first and the second timer merely represent processing variables and may be controlled by a common clock generator, or may merely result from calculations of differences of a continuously running clock generator.

In a subsequent step S16, the position s of the movable element 44 is detected again, whereupon it is checked in step S17 whether or not the position s of the movable element 44 has reached the shift position sn. If the desired shift position has now been reached, then the shift process has been successfully completed (S21). If the desired shift position sn has not been reached, then in step S18, the method again interrogates a rotation of the gearing. If the gearing is at a standstill (S18 NO), then the method checks, in step S20, whether or not the second timer tz2 indicates the exceedances of a second duration ΔT2. For as long as the second duration ΔT2 has not yet been exceeded (S20 NO), the method returns to the step S16, such that the motor continues to be operated with the motor voltage U2, and the position detection and the interrogation of the gearing rotation are repeated. Here, if it is identified in the intervening time that the gearing is rotating again (S18 YES), then in a step S19, the second timer is reset to zero, because it is assumed that the fault has been eliminated and the movable element is moving onwards in the direction of the shift position.

If, in the case of a gearing which is at a standstill, the shift position has not yet been reached after the expiry of the second duration ΔT2 (S18 NO, S20 YES), the method identifies that the shift process has failed and performed fault handling in step S22. The fault handling may include the outputting of a fault message in the form of a visual or acoustic signal, the transmission of a fault notification by the radio module 170, or the like. The method may possibly also, after waiting for a further third duration ΔT3, perform another shift attempt, that is to say return to step S3. Alternatively, the method may wait until another shift signal is transmitted by the user.

Figure 20A:
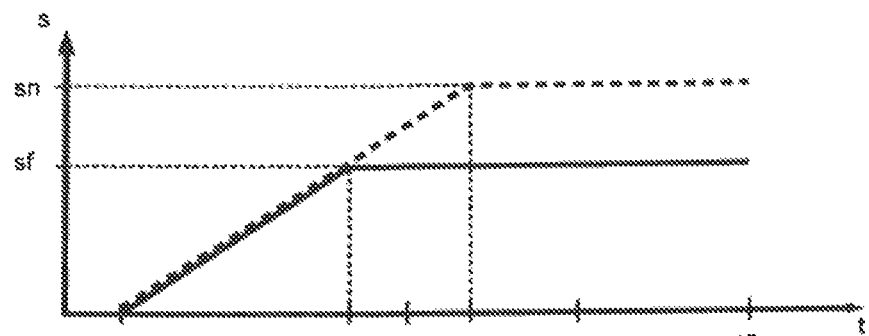
FIG. 20a shows a travel-time diagram illustrating actuating movement of a movable element of the embodiment.
Figure 20B:
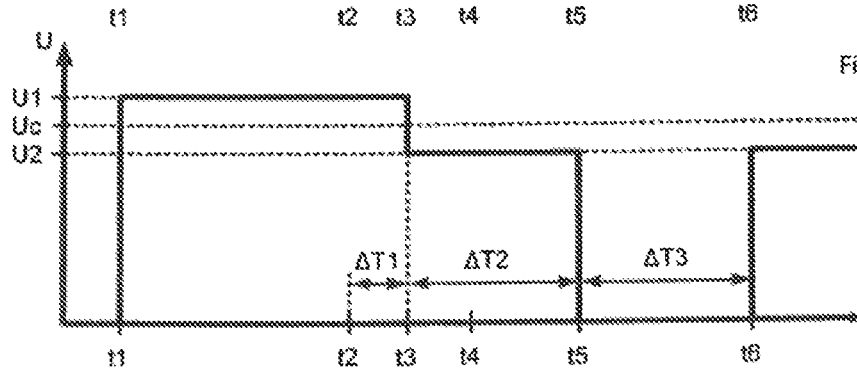
FIG. 20b shows a voltage-time diagram illustrating a motor voltage of the motor of the embodiment during an actuating process.

FIGS. 20a and 20b show the effect of the above-described shift method on the basis of two time diagrams, wherein the two time axes t of FIGS. 20a and 20b have the same scales, such that FIGS. 20a and 20b can be compared with one another with respect to the time axis t.

FIG. 20a illustrates, by means of a dashed line, a normal, fault-free shift process. After receipt of a shift signal at the time t1, the movable element 44 moves to the shift position sn corresponding to the desired shift stage, and reaches said shift position at a time t4. By contrast, a solid line in FIG. 20a illustrates the case of a fault, in which the movement of the movable element 44 is impeded for example owing to external mechanical influences, wear or fouling. The movable element then does not reach the desired shift position sn, but rather, at a time t2, remains at a shift position sf which differs from sn. This fault at the time t2 may be detected for example by means of the output of the position detection element 130, which indicates that the position of the movable element 44 is no longer changing or is no longer changing in the expected manner. As can be seen in FIG. 20b, the motor voltage U1 at the motor 74 is then maintained further for a duration ΔT1. For the duration ΔT1, the motor 74 bus continues to be supplied with full power, which may also have the effect that the overload clutch 118 is triggered if the fault endures. After the first duration ΔT1 has expired, the motor voltage is, at the time t3, reduced to the reduced motor voltage U2, such that the overload clutch 118 in any case remains engaged or is re-engaged. For the duration ΔT2, the motor 74 is then operated with the reduced motor voltage U2, in order to continue to attempt to attain the desired shift position sn, wherein a triggering of the overload clutch 118 is however then avoided. After the second duration $\Delta T2$ has expired, the motor voltage is, at a time t5, preferably reset to 0, such that the motor 74 is preferably deactivated. A renewed shift attempt may then be performed for example at a time t6 if the operator gives a new shift command or a predetermined duration $\Delta T3$ has expired.

The first duration $\Delta T1$ may lie between 5 ms and 80 ms, preferably between 10 ms and 40 ms, in order to reduce a repeated triggering of the overload clutch. The second duration $\Delta T2$ is preferably longer than the first duration $\Delta T1$, and may lie between 40 ms and 500 ms, preferably between 60 ms and 200 ms, in order to wait a sufficient length of time for an elimination of the fault but at the same time minimize a load on the shift arrangement.

Below, referring to FIGS. 21 to 23, a trim device and a trim process according to a further embodiment will be discussed in more detail.

Figure 21:
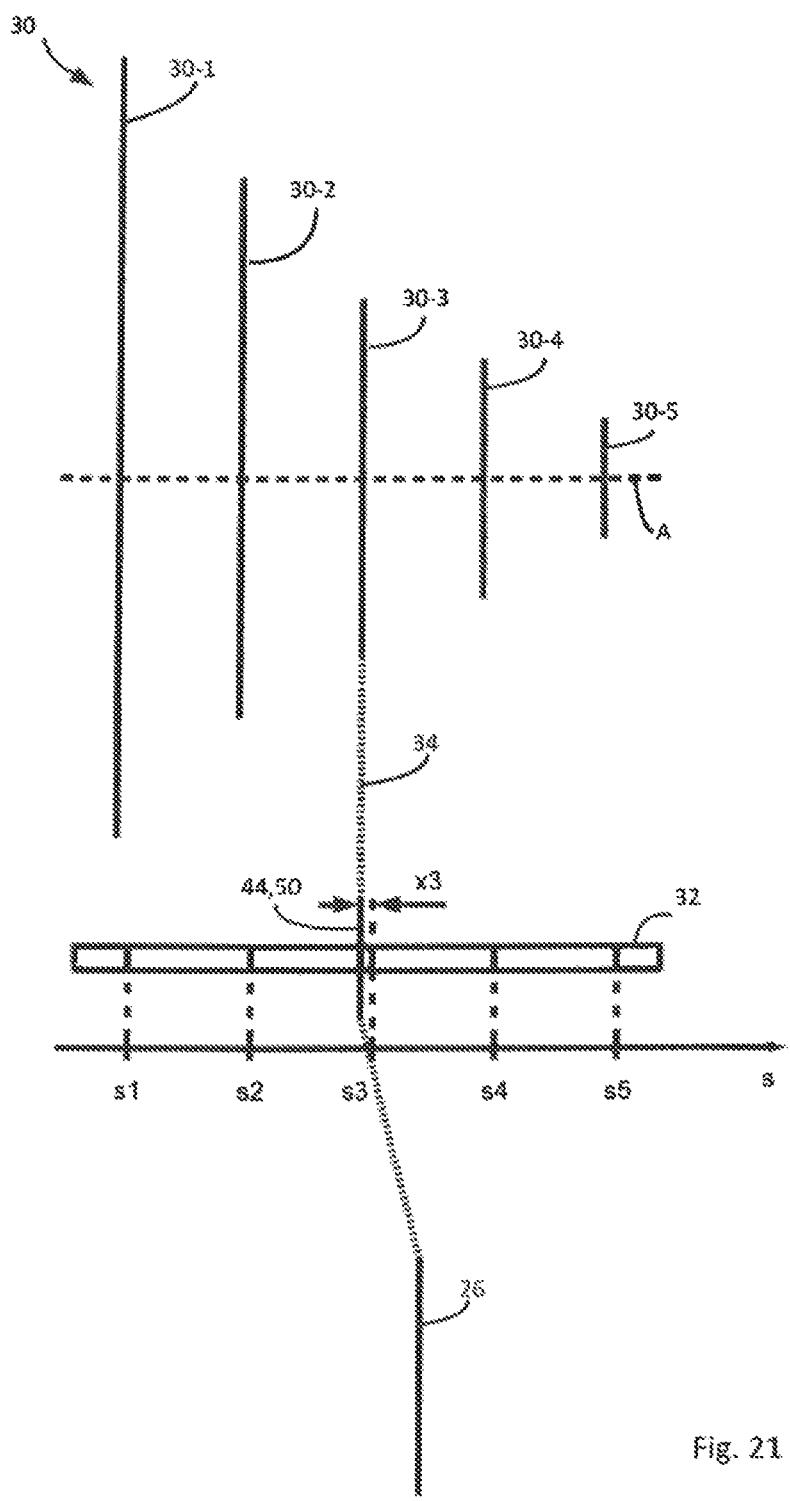
FIG. 21 is a schematic illustration of a front chain wheel, of an actuating device according to the embodiment and of a pinion assembly.

FIG. 21 schematically shows the running of the chain 34 between the front chain wheel 26, the shift mechanism 32 and the rear pinion assembly 30. For the sake of clarity, in this case only five pinions 30-1 to 30-5 are shown. The movable element 44 of the shift mechanism 32, in particular the chain guide wheels 50, move the chain into a position s, such that the chain is, in the ideal situation, aligned with a predetermined pinion of the pinion assembly 30 or is it any rate situated in an ideal position in relation to the pinion for uniform chain running. In the different shift stages, the shift mechanism 32 moves the chain 34 over respective pinions 30-1, 30-2, . . . and, for this purpose, moves the movable element 44 into respective shift positions s1, s2, . . . . Each shift stage is thus assigned a shift position s1, s2, . . . . This assignment may be stored in the form of shift position parameters in a shift table (FIG. 22), wherein the shift position parameters may be the shift positions themselves, or may be parameters that specify the shift positions.

The shift table may be stored in the memory 168 of the electronic control device 160. The electronic control device 160 then, for the setting of a desired shift stage Sn, determines an associated value sn from the shift table and activates the motor 74 such that the movable element 44 reaches the shift position sn. As can be seen in FIG. 22, the shift position sn is not stored directly in the shift table of the present exemplary embodiment. Instead, in the shift table, a standard position (standard position parameter) s0_1, s0_2, . . . and an amount of trim (trim parameter) x1, x2, . . . are stored for each shift stage. The shift position sn is then obtained from the sum of standard position s0 and amount of trim x. For example, the shift position s1 of the shift stage 1 is obtained from the sum s0_1+x1 etc. This permits a simple reset of the shift position to a basic setting or factory setting.

According to one embodiment, the entries of the shift table can be changed by virtue of two shift position parameters of different shift stages being changed by different amounts. In a shift table according to the example of FIG. 22, it would for example be possible for the amounts of trim x1, x2, . . . to each be overwritten with new values, such that at least two, preferably all, amounts of trim can be changed independently of one another. The changes to the entries of the shift table may in this case preferably be performed by means of wirelessly received control commands, in particular by means of control commands which are received by the radio module 170 and transmitted to the CPU 166 and to the memory 168. For this purpose, a wireless input appliance, in particular a mobile terminal, may be used. Use may particularly preferably be made of a smartphone, tablet or similar mobile terminal, on which there is installed a predetermined program code (app) which makes it possible for the user to directly influence the shift table.

In particular, such program code may prompt the user to input a desired shift stage and to input an amount of trim for said shift stage. The program code may furthermore be configured to transmit instruction for setting a particular shift stage to the electronic control device 160. Furthermore, the radio module 170 may be configured to transmit data regarding the stored entries of the shift table to the mobile terminal.

In one convenient variant, the program code may allow a user to increase or decrease the amount of trim x in stepwise fashion for a selected shift stage, wherein the program code, for each set amount of trim, transmits an instruction to the electronic control device 160 to adjust the movable element into the corresponding shift position, which is determined from the standard position and the amount of trim. This makes it possible for the user to trim the shift position of a particular shift stage during ongoing operation, that is to say simultaneously check the uniform running of the chain and the exact alignment between chain guide wheels 50 and pinion 30-n. The user can then set each of the shift stages, check the shift process for the chain running and the alignment between chain guide wheels 50 and pinion 30-n, and if necessary individually perform an exact adaptation of the shift position for each shift stage.

The checking of the chain running and the optimum shift position may, according to a further advantageous feature, be assisted by means of an evaluation of the output of the acceleration sensor 172. In particular, the acceleration sensor 172 may detect a vibration and transmit a value representing the intensity or amplitude of the vibration to the CPU 166. The CPU 166 may indicate the value representing the vibration in suitable form to the user, for example by transmission of the value by means of the radio module 170 to a receiving unit, in particular a mobile terminal, on which the value representing the vibration is displayed, or by corresponding activation of the LED 176, which in a simple variant could output information regarding the intensity or amplitude of the vibration by means of a particular flashing code or the like. The user can then advantageously use a method for trimming the actuating device in which the user sets a particular shift stage S1 and subsequently sets different amounts of trim x, such that the movable element 44 is moved into shift positions which are situated in the vicinity of the previously input shift position, in particular of the standard shift position S0. For each set shift position, the user can detect the magnitude of the vibration, whereupon the user can ultimately select that amount of trim or that shift position in the case of which the vibrations were smallest. Such a setting then corresponds, as a good approximation, to an optimum shift position. The user can finally repeat the process for each shift stage for which the user seeks an adaptation of the shift position.

Figure 23:
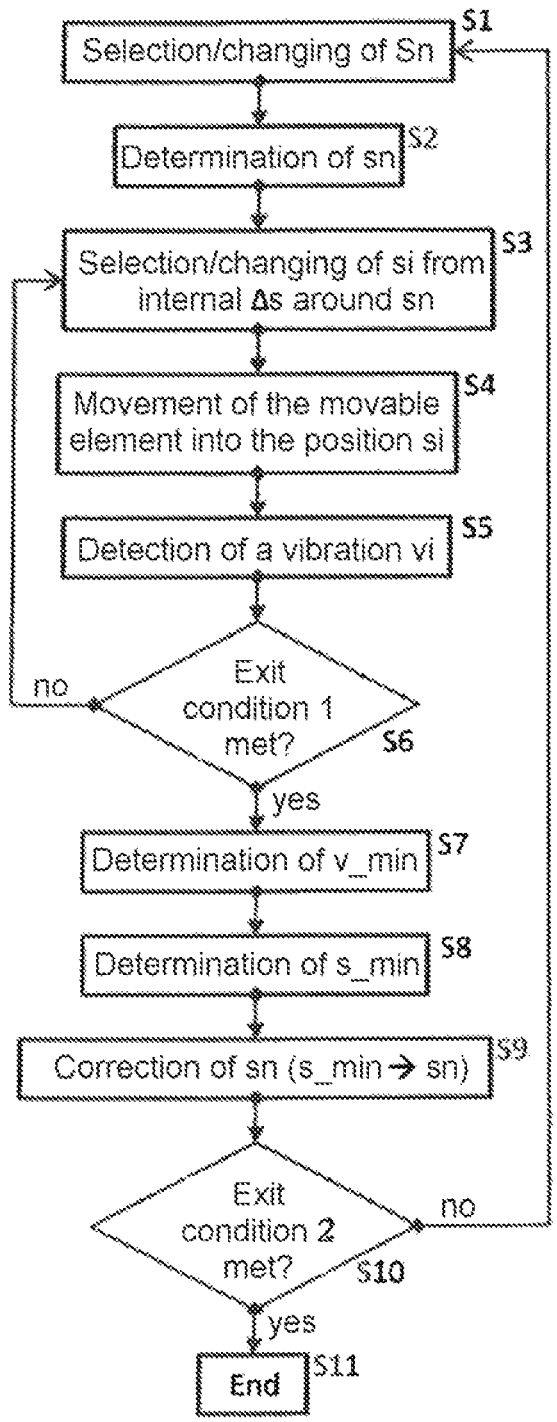
FIG. 23 shows a flow diagram illustrating a method according to a first variant for the trimming of the actuating device of the embodiment.

In a particularly advantageous refinement of the trim method discussed above using the acceleration sensor 172, a trim process for one or more shift stages may be performed semi-automatically or fully automatically using a trim program illustrated in FIG. 23. The trim program may in this case be executed either directly on the CPU 166 or alternatively on a control unit connected to the electronic control device 160. In particular, the trim program may be installed on a mobile terminal, such as a smartphone, and may transmit the individual control instructions wirelessly by means of the radio module 170 to the CPU 166.

In a first step S1 of the trim program, a shift stage Sn is selected, or a shift stage that has already been set is changed.

In the subsequent step S2, on the basis of the shift table (FIG. 22), the shift position sn assigned to the shift stage Sn is determined (for example by addition of the standard shift position $s0\_n$ to the amount of trim xn).

In the subsequent step S3, from an interval $\Delta s$ which includes the shift position sn (sn lies in the interval $\Delta s$), a value si is selected. The interval $\Delta s$ is in this case preferably smaller than or equal to a mean distance between the shift positions of two adjacent shift stages. In step S4, the movable element is subsequently moved into the position si, whereupon, in step S5, a detection of the vibration vi of the shift mechanism 32 is performed by means of the position sensor 130.

The steps S3 to S5 are preferably repeated until a predetermined exit condition 1 is met. Upon every repetition, a different value si is selected from the interval $\Delta s$, the movable element is moved to the new position si, and the vibration vi is measured. The cycle is repeated until the exit condition 1 is met. As exit condition 1, provision may be made for a predetermined number of different positions si to have been assumed and tested. For example, the positions si may be selected at uniform distances from a smallest value of the interval $\Delta s$ to a greatest value of the interval $\Delta s$, and the exit condition 1 is met when all positions si have been assumed. Alternatively, the exceedance of a predetermined duration, or a user input, may be selected as exit condition 1.

In the subsequent step S7, if the exit condition 1 has been met, the vibrations vi measured for the respective position si are compared with one another, and a minimum value v_min is determined. The position si at which the minimum value v_min occurs is, in step S8, determined as the position with the smallest vibration s_min. Under the assumption that the best shift position is attained at this position, the corresponding shift position parameter in the shift table is then updated in step S9, such that then, from the shift table, the value x_min is obtained as the new shift position sn for said shift stage Sn (for example, the amount of trim xn is set to x_min–$s0\_n$). The shift table is thus updated and newly described for said shift stage Sn.

The steps S1 to S9 may be performed repeatedly for multiple shift stages Sn until an exit condition 2 is met. In particular, exit condition 2 may demand that all shift stages of the shift mechanism 32 have been selected at least once (step S1), and thus an optimum shift position parameter has been determined for all shift stages by means of the steps S2 to S9. Alternatively, the exit condition 2 may interrogate the expiry of a predetermined duration or interrogate a user input. If the exit condition 2 has been met, then the trim program ends (step S11).

Figure 24:
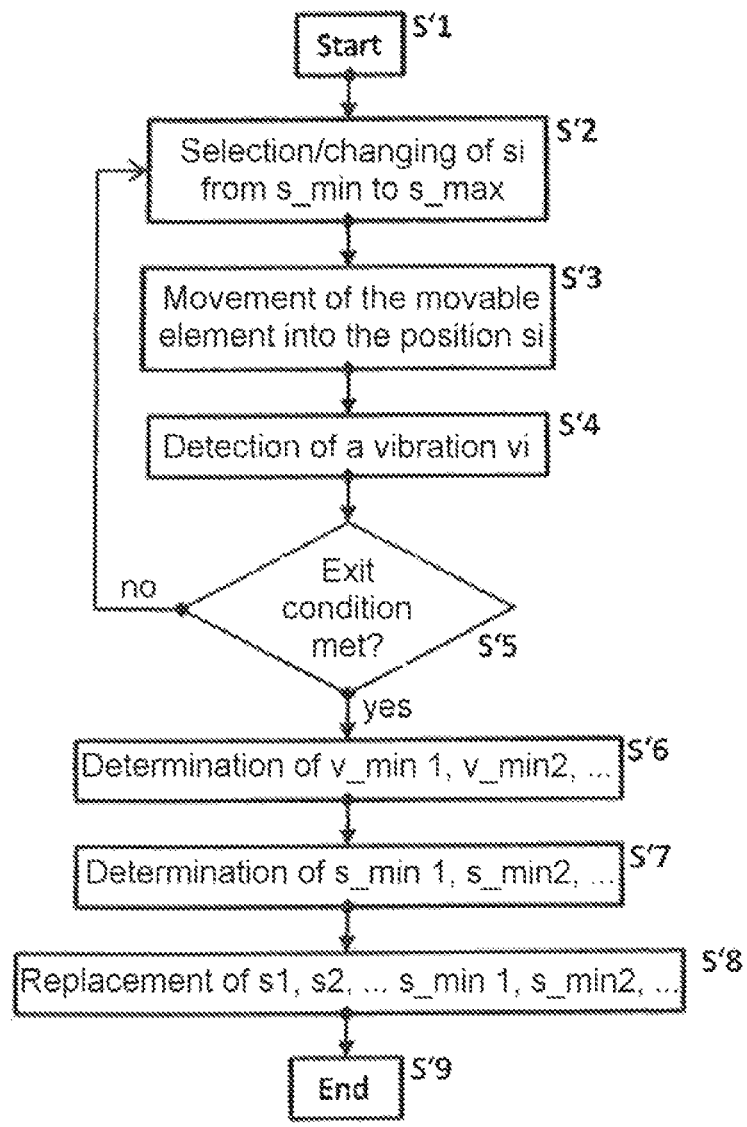
FIG. 24 shows a flow diagram illustrating a method according to a second variant for the trimming of the actuating device of the embodiment.

FIG. 24 shows a variant of the above-described trim program according to an embodiment. In a step S'1, the trim program is started, for example by means of a user input by means of the function switch 174 or by means of a start command which has been input at the mobile terminal and received by the radio module 170 of the electronic control device 160. Then, in step S'2, a position si within the maximum range of movement of the movable element 44 from s_min to s_max is selected. The electromechanical drive 58 then moves the movable element 44 in step S'3 into the position si, whereupon, in step S'4, a vibration vi is detected at said position si. The steps S'2 to S'4 are performed in a cycle until an exit condition of step S'5 is met. In particular, it is envisaged here that the movable element runs once completely through the entire movement range from s_min to s_max, and preferably also runs through the movement range again in the opposite direction, and possibly even runs completely through the movement range more than twice, that is to say sets all possible positions s of the movable element at least once. Accordingly, the exit condition of step S'5 interrogates whether the entire movement range of the movable element has been completely run through the desired number of times.

If, in particular in the case of a multiple run-through, certain positions si are assumed multiple times, then it is advantageously possible for the vibrations vi respectively measured at said position si to be averaged in order, at each position si, to determine a mean vibration vim, such that the accuracy of the vibration measurement is improved.

If the exit condition has been met (S'5 YES), the program, in step S'6, searches in the data series of the measured values of the vibration vi or vim for minimum values v_min1, v_min2, . . . and, in step S'7, determines the positions s_min1, s_min2, . . . assigned to these minimum values. In this way, it is the intention to find, for each shift stage, exactly one position s_min for which the vibration assumes a minimum and which thus represents a best possible shift position. Accordingly, in step S'8, a shift table is updated such that the stored shift positions s1, s2, . . . are replaced with the new-found best shift positions s_min1, s_min2, . . . .

If, in the shift table, instead of the shift positions si, s2, . . . , there are stored standard positions s0_1, s0_2, . . . and associated amounts of trim x1, x2, . . . (according to the example of FIG. 22), then it is alternatively possible, instead of the step S'8, for an alignment of the standard positions s01, s0_2, . . . stored in the shift table with the found shift positions s_min1, s_min2, . . . to be performed, and the amounts of trim of the shift table can be set to the values x1=s_min1–s0_1, x2=s_min2–s0_2, . . . .

In the subsequent step S'9, the trim program finally ends.

The above-stated variants of the trim device and of the trim method and of the trim program permit individual setting of individual amounts of trim or individual shift positions of the respective shift stages. However, variants are also considered to be advantageous in which a single trim process acts simultaneously on the amounts of trim of all shift stages or substantially all shift stages, albeit to different extents. In this way, a particularly simple trim function is obtained for compensating misalignments between shift mechanism 32 and pinion assembly 30 which increase or decrease continuously from pinion to pinion. An example of this is an adjustment of the position of the movable element 44 owing to an axial force exerted by the chain 34. In the case of a relatively short chain being used, this tensile force increases, wherein the extent of the associated misalignment between shift mechanism 32 and pinion assembly 30 then likewise increases with increasing offset between pinion and front chain wheel 24, that is to say with increasing skew of the chain 34. The electronic control device 160 may be configured to change the amount of trim x1, x2, . . . simultaneously in a predetermined manner in order to compensate for the above-describe effects of chain skew.

For example, if Sn is a neutral shift stage, in the case of which the chain skew and thus the axial force acting on the shift mechanism 32 is at its smallest, then the actuating device may advantageously be configured to cause the amounts of trim to increase in each case with increasing distance of the shift positions from the shift position sn. For a particular chain length or a particular actual configuration of the bicycle, it is possible for predetermined sets of amounts of trim x1, x2, . . . to be stored in the memory 168 or loaded onto the electronic control device 160 from a mobile terminal.

Figure 25:
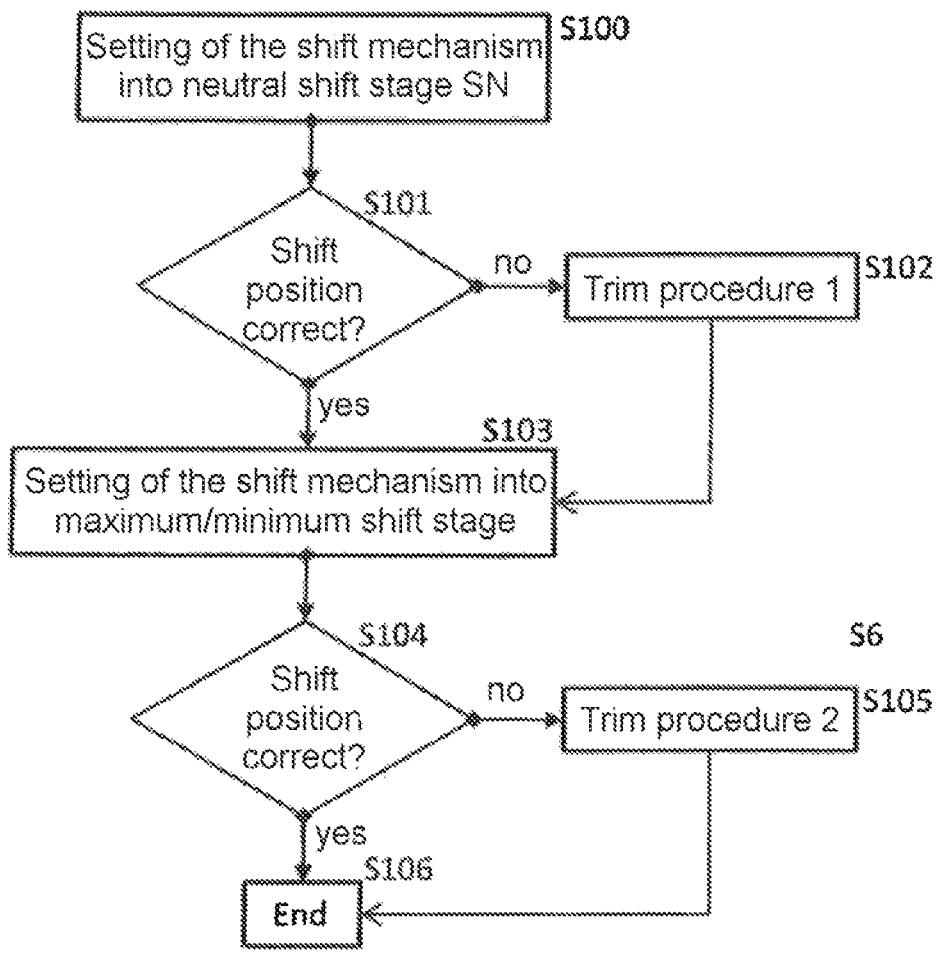
FIG. 25 shows a flow diagram illustrating a method according to a third variant for the trimming of the actuating device of the embodiment.

A trim process with such predefined sets of amounts of trim may take place in the step sequence illustrated in FIG. 24. The trim method illustrated in FIG. 25 may for example be performed after the initial installation of a shift mechanism on a bicycle, during the course of maintenance work or after an exchange of components of the bicycle.

In a first step S100, the shift mechanism is set into a neutral shift stage SN. A neutral shift stage SN is a particular shift stage, usually a central shift stage, in which substantially no chain skew occurs, that is to say a pinion which is arranged approximately at the same axial height as the chain wheel. In this neutral shift stage SN, it is checked, in step S101, whether the shift position set by the shift mechanism is correct, that is to say whether the chain guide wheel is set at the correct axial height relative to the corresponding pinion. For this purpose, the synchronism of the chain may be checked, or a vibration of the shift mechanism may be detected, as described above. If there is a need for correction (step S101 NO), then a trim procedure 1 (step S102) is performed, which may substantially correspond to a trim process known per se, for example a trim process in which all shift positions are changed substantially by the same amount. The trim procedure 1 is completed when the correct shift position for the neutral shift stage SN has been attained.

Finally, in a step S103, the shift mechanism is set into an extreme shift stage, for example the highest shift stage or the lowest shift stage (step S103). Subsequently, in step S104, it is checked again whether the shift position of the movable element is correct, that is to say whether the chain guide wheel is situated in the correct position relative to the pinion. If this is not the case (step S104 NO), then a trim procedure 2 is initiated, which operates with different amounts of trim for the different shift positions. In particular, in the trim procedure 2, a set of amounts of trim may be selected in which the amounts of trim are adjusted simultaneously but by different amounts. There is preferably a series of predefined sets of trim amounts available, which can be selectively set. The setting process may in this case be performed manually by a user or by means of an electronic command for changing the shift table. If a suitable amount of trim has been found which ensures correct positioning in the selected shift stage, then the trim method finally ends in step S106. If desired, the method S100 to S106 may be repeated for different shift stages, in particular different extreme shift stages, in order to find the suitable amounts of trim.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

What is claimed is:

1. An actuating device for a bicycle comprising:
 a static element that is arranged positionally fixedly in relation to a bicycle frame;
 a movable element that is movable in relation to the static element;
 an operating device for selecting a desired shift stage from a multiplicity of available shift stages, the operating device configured for moving the movable element into a shift position corresponding to the selected shift stage;
 a vibration sensor for determining a vibration of the actuating device; and
 a trim device for adjusting the shift positions assigned to the shift stage;
 wherein the trim device is configured to adjust at least one of the shift positions to correspond to when the vibration of the actuating device is the smallest.

2. The actuating device of claim 1, wherein the trim device is configured to adjust the amounts of trim relative to one another for at least two shift stages.

3. The actuating device of claim 1, wherein the trim device is configured to, for all shift stages of a series of successive shift stages, adjust the respective shift positions by increasing or decreasing amounts of trim.

4. An actuating device for a bicycle comprising:
 a static element that is arranged positionally fixedly in relation to a bicycle frame;
 a movable element that is movable in relation to the static element;
 an electromechanical drive that provides drive force for a movement of the movable element;
 an electronic control device in which, for a multiplicity of shift stages, in each case for each shift stage, there is stored at least one shift position parameter that corresponds to a shift position of the movable element in the respective shift stage, wherein the control device is configured to, in reaction to a shift stage selection signal that represents a shift stage to be set, activate the electromechanical drive on the basis of the shift position parameter of the shift stage to be set such that the movable element reaches the shift position; and
 a trim device for changing at least one of the shift position parameters independently of the other shift position parameters at the instigation of a user,
 wherein the trim device is configured to change at least one of the shift position parameters to correspond to when a vibration of the actuating device is the smallest.

5. The actuating device of claim 4, wherein the electronic control device, for each shift stage of the multiplicity of shift stages, stores in each case one standard position parameter that corresponds to a predetermined standard shift position of the movable element, wherein the shift position parameter preferably represents a deviation from the standard position parameter.

6. The actuating device of claim 4, further comprising:
 an acceleration sensor that provides an item of information relating to a vibration of the actuating device.

7. The actuating device of claim 4 further comprising program code that can be executed on a portable appliance, wherein the program code is configured to activate the portable appliance to:
 receive a user input regarding the selection of a shift stage of the multiplicity of shift stages; and
 receive a user input regarding the setting and/or changing of the shift position parameter.

8. A method for setting an actuating device comprising:
 selecting a shift stage;
 retrieving a stored shift position parameter, that is assigned to a shift position of a movable element of the actuating device in the respective shift stage, from a memory;
 detecting a vibration of the actuating device;
 changing the shift position parameter to correspond to when the vibration of the actuating device is the smallest; and
 storing the changed shift position parameter in the memory.

9. The method of claim 8, further comprising:

setting a selected shift stage by means of the actuating device;

detecting a functional parameter of the actuating device that represents an accuracy of the shift stage setting;

adjusting the shift position parameter so that the functional parameter changes in the direction of an improvement of the accuracy of the shift stage setting; and storing the shift position parameter.

10. The method of claim 9, wherein the control device automatically sets shift stages for each of the multiplicity of shift stages by:

setting the actuating device into a first shift stage of a multiplicity of shift stages;

setting the position of the movable element to a multiplicity of positions within a predetermined interval around the shift position of the set shift stage, and detecting a vibration of the actuating device for each set position;

setting the shift position parameter to a value that corresponds to the position of the movable element at which the smallest vibration has been detected; and setting the actuating device into a further shift stage of the multiplicity of shift stages.

11. The method of claim 8, further comprising:

indicating to a user the detected vibration, and wherein changing the shift position parameter to correspond to when the vibration of the actuating device is the smallest includes the user selecting a trim value or the shift position parameter where the detected vibration was the smallest.

* * * * *